United States Patent
Agrawal et al.

(10) Patent No.: US 11,544,494 B2
(45) Date of Patent: Jan. 3, 2023

(54) ALGORITHM-SPECIFIC NEURAL NETWORK ARCHITECTURES FOR AUTOMATIC MACHINE LEARNING MODEL SELECTION

(71) Applicant: Oracle International Corporation, Redwood Shores, CA (US)

(72) Inventors: Sandeep Agrawal, San Jose, CA (US); Sam Idicula, Santa Clara, CA (US); Venkatanathan Varadarajan, Austin, TX (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1376 days.

(21) Appl. No.: 15/884,163

(22) Filed: Jan. 30, 2018

(65) Prior Publication Data

US 2019/0095756 A1 Mar. 28, 2019

Related U.S. Application Data

(60) Provisional application No. 62/565,004, filed on Sep. 28, 2017.

(51) Int. Cl.
*G06N 3/08* (2006.01)
*G06N 5/04* (2006.01)
(Continued)

(52) U.S. Cl.
CPC ......... *G06K 9/6256* (2013.01); *G06K 9/6227* (2013.01); *G06K 9/6262* (2013.01);
(Continued)

(58) Field of Classification Search
CPC .. G06K 9/6256; G06K 9/6227; G06K 9/6262; G06K 9/6269; G06K 9/6271;
(Continued)

(56) References Cited

U.S. PATENT DOCUMENTS 6,842,751 B1 * 1/2005 Vilalta ........................ 706/14
9,009,687 B2 4/2015 Caira
(Continued)

FOREIGN PATENT DOCUMENTS

EP        3 101 599 A2   12/2016
WO   WO 2008/133509 A1   11/2008

OTHER PUBLICATIONS

Merkwirth, C., & Wichard, J. (2003). A Short Introduction to ENTOOL. Jan. 14, 1-11. (Year: 2003).*

(Continued)

*Primary Examiner* — Hal Schnee
(74) *Attorney, Agent, or Firm* — Hickman Becker Bingham Ledesma LLP

(57) ABSTRACT

Techniques are provided for selection of machine learning algorithms based on performance predictions by trained algorithm-specific regressors. In an embodiment, a computer derives meta-feature values from an inference dataset by, for each meta-feature, deriving a respective meta-feature value from the inference dataset. For each trainable algorithm and each regression meta-model that is respectively associated with the algorithm, a respective score is calculated by invoking the meta-model based on at least one of: a respective subset of meta-feature values, and/or hyperparameter values of a respective subset of hyperparameters of the algorithm. The algorithm(s) are selected based on the respective scores. Based on the inference dataset, the selected algorithm(s) may be invoked to obtain a result. In an embodiment, the trained regressors are distinctly configured artificial neural networks. In an embodiment, the trained regressors are contained within algorithm-specific ensembles. Techniques are also provided for optimal training of regressors and/or ensembles.

20 Claims, 8 Drawing Sheets

(51) Int. Cl.
G06K 9/62 (2022.01)
G06N 20/20 (2019.01)

(52) U.S. Cl.
CPC ......... *G06K 9/6269* (2013.01); *G06K 9/6271* (2013.01); *G06K 9/6282* (2013.01); *G06N 3/08* (2013.01); *G06N 5/04* (2013.01); *G06N 20/20* (2019.01)

(58) Field of Classification Search
CPC .......... G06K 9/6282; G06N 3/08; G06N 5/04; G06N 20/20; G06N 3/04; G06V 10/82
See application file for complete search history.

(56) References Cited

U.S. PATENT DOCUMENTS

| | | | |
|---|---|---|---|
| 10,489,215 | B1 | 11/2019 | Wen |
| 10,554,738 | B1 | 2/2020 | Ren |
| 10,606,649 | B2 | 3/2020 | Baggerman |
| 10,832,087 | B1 | 11/2020 | Wang et al. |
| 2002/0169735 | A1 | 11/2002 | Kil et al. |
| 2010/0153956 | A1 | 6/2010 | Capps, Jr. |
| 2013/0231552 | A1* | 9/2013 | Grady ............... A61B 5/7267 600/410 |
| 2014/0101117 | A1 | 4/2014 | Uzzaman |
| 2014/0188768 | A1* | 7/2014 | Bonissone ............ G06N 20/00 706/12 |
| 2014/0344193 | A1 | 11/2014 | Bilenko et al. |
| 2016/0004621 | A1 | 1/2016 | Gongloor |
| 2016/0321561 | A1* | 11/2016 | Röder .................... G06N 20/20 |
| 2016/0358099 | A1 | 12/2016 | Sturlaugson et al. |
| 2017/0061329 | A1 | 3/2017 | Kobayashi et al. |
| 2017/0068675 | A1 | 3/2017 | Hazel |
| 2017/0169360 | A1 | 6/2017 | Veeramachaneni et al. |
| 2018/0022539 | A1 | 1/2018 | Vedani |
| 2018/0060211 | A1 | 3/2018 | Allen |
| 2018/0060220 | A1 | 3/2018 | Yao |
| 2018/0060330 | A1* | 3/2018 | Clinton ............ G06F 16/24578 |
| 2018/0060738 | A1* | 3/2018 | Achin .................... G06N 20/00 |
| 2018/0107711 | A1 | 4/2018 | Tariq |
| 2018/0109589 | A1 | 4/2018 | Ozaki et al. |
| 2018/0225391 | A1 | 8/2018 | Sali et al. |
| 2018/0360390 | A1* | 12/2018 | Gaudiuso ............ A61B 5/4325 |
| 2019/0018614 | A1 | 1/2019 | Balko |
| 2019/0087529 | A1 | 3/2019 | Steingrimsson |
| 2019/0095764 | A1* | 3/2019 | Li ........................ G06K 9/6256 |
| 2019/0095785 | A1 | 3/2019 | Sarkar et al. |
| 2019/0095818 | A1 | 3/2019 | Varadarajan |
| 2019/0095819 | A1 | 3/2019 | Varadarajan |
| 2019/0197357 | A1 | 6/2019 | Anderson |
| 2019/0244139 | A1 | 8/2019 | Varadarajan |
| 2019/0303475 | A1 | 10/2019 | Jindal |
| 2019/0340095 | A1 | 11/2019 | Faibish |
| 2019/0370695 | A1 | 12/2019 | Chandwani et al. |
| 2019/0392255 | A1 | 12/2019 | Franklin |
| 2020/0034197 | A1 | 1/2020 | Nagpal |
| 2020/0045049 | A1 | 2/2020 | Apostolopoulos |
| 2020/0076840 | A1 | 3/2020 | Peinador |
| 2020/0076841 | A1 | 3/2020 | Hajimirsadeghi |
| 2020/0076842 | A1 | 3/2020 | Zhou |
| 2020/0082013 | A1 | 3/2020 | Triplet et al. |
| 2020/0125545 | A1 | 4/2020 | Idicula |
| 2020/0125568 | A1 | 4/2020 | Idicula |
| 2020/0327448 | A1 | 10/2020 | Yakovlev |
| 2020/0334569 | A1 | 10/2020 | Moghadam |
| 2020/0364599 | A1 | 11/2020 | Ma |
| 2020/0380378 | A1 | 12/2020 | Moharrer |
| 2021/0011832 | A1 | 1/2021 | Togawa |
| 2021/0390466 | A1 | 12/2021 | Varadarajan et al. |

OTHER PUBLICATIONS

N-tuple. Wolfram MathWorld. from https://mathworld.wolfram.com/n-Tuple.html (Year: 2015).*

Sedghi, H., & Anandkumar, A. (2015). Provable methods for training neural networks with sparse connectivity. arXiv preprint arXiv: 1412.2693v4. (Year: 2015).*

Heinermann, J., & Kramer, O. (2016). Machine learning ensembles for wind power prediction. Renewable Energy, 89, 671-679. (Year: 2016).*

Haixiang, G., Yijing, L., Shang, J., Mingyun, G., Yuanyue, H., & Bing, G. (2016). Learning from class-imbalanced data: Review of methods and applications. Expert systems with applications, 73, 220-239. (Year: 2016).*

Kwak, S. K., & Kim, J. H. (2017). Statistical data preparation: management of missing values and outliers. Korean journal of anesthesiology, 70(4), 407. (Year: 2017).*

Chauhan, A. (Feb. 24, 2017). Categorical encoding, one hot encoding and why use it? Everything Artificial Intelligence, from https://aichamp.wordpress.com/2017/02/24/categorical-encoding-one-hot-encoding-and-why-use-it/ (Year: 2017).*

Giraud-Carrier, Christophe. "The data mining advisor: meta-learning at the service of practitioners." Fourth International Conference on Machine Learning and Applications (ICMLA'05). IEEE, 2005. (Year: 2005).*

Gonzalez et al., "Batch Bayesian Optimization via Local Penalization", Proceedings of the 19th International Conference on Artificial Intelligence and Statistics, dated 2016, 10 pages.

Kiros et al., "Skip-Thought Vectors", dated 2015, 9 pages.

Kingma et al., "Adam: A Method for Stochastic Optimization", Published as a conference paper at ICLR 2015, dated Jan. 1, 2017, 15 pages.

Kim, Yongjoon, "Chapter 10, Sequence Modeling: Recurrent and Recursive Nets", dated Apr. 1, 2016, 50 pages.

Karpathy et al., "Deep Visual-Semantic Alignments for Generating Image Descriptions", dated 2015, 10 pages.

Hutter et al., "Sequential Model-Based Optimization for General Algorithm Configuration", dated 2011, 15 pages.

Huang et al., "Online System Problem Detection by Mining Patterns of Console Logs", dated Dec. 2009, 11 pages.

Hochreiter, Sepp, "Long Short Term Memory", Nural Computation, dated Nov. 15, 1997, 46 pages.

Hinton et al., "Neural Networks for Machine Learning Lectures Overview of Mini-batch Gradient Descent", dated 2012, 31 pages.

Hill et al., "Learning Distributed Representations of Sentences from Unlabelled Data", dated Feb. 10, 2016, 11 pages.

Hamilton et al., "Representation Learning on Graphs: Methods and Applications", Copyright 2017 IEEE, 24 pages.

Hamilton et al., "Inductive Representation Learning on Large Graphs", 31st Conference on Neural Information Processing Systems (NIPS 2017), Long Beach, CA, USA, 11 pages.

Haider et al., "Generating Realistic Intrusion Detection System Dataset Based on Fuzzy Qualitative Modeling", Journal of Network and Computer Applications 87 (2017) 8 pages.

Haddadpajouh et al., "A Two-layer Dimension Reduction and Two-tier Classification Model for Anomaly-Based Intrusion Detection in IoT Backbone Networks", dated 2016, 12 pages,.

Aggarwal et al., "Analysis of KDD Dataset Attributes—Class wise For Intrusion Detection", 3rd International Conference on Recent Trends in Computing 2015, 10 pages.

Ding et al., "PCA-Based Network Traffic Anomaly Detection" Tsinghua Science and Technology, vol. 21, No. 5, Oct. 2016, 10 pages.

Bengio et al., "A Neural Probabilistic Language Model", Journal of Machine Learning Research 3, dated Feb. 2003, 19 pages.

Bengio et al., "Learning Deep Architectures for AI", dated 2009, 71 pages.

Berlin et al., "Malicious Behavior Detection using Windows Audit Logs", dated Aug. 25, 2015, 10 pages.

Bontemps et al., "Collective Anomaly Detection based on Long Short Term Memory Recurrent Neural Network", dated 2016, 12 pages.

Buczak et al., "A Survey of Data Mining and Machine Learning Methods for Cyber Security Intrusion Detection", IEEE Communications Surveys & Tutorials, vol. 18, No. 2, Second Quarter 2016, 24 pages.

(56) References Cited

OTHER PUBLICATIONS

Grover et al., "node2vec: Scalable Feature Learning for Networks", KDD '16, Aug. 13-17, 2016, San Francisco, CA, USA, 10 pages.
Dai et al., "Semi-supervised Sequence Learning", dated 2015, 9 pages.
Graves et al., "Speech Recognition With Deep Recurrent Neural Networks", dated Mar. 22, 2013, 5 pages.
Du et al. DeepLog: Anomaly Detection and Diagnosis from System Logs through Deep Learning, CCS'17, Oct. 30-Nov. 3, 2017, 14 pages.
Garcia-Duran et al. "Learning Graph Representations with Embedding Propagation", 31st Conference on Neural Information Processing Systems (NIPS 2017), 12 pages.
Ghosh et al., "Detecting Anomalous and Unknown Intrusions Against Programs", dated 1998, 9 pages.
Gibert et al., "Graph Embedding in Vector Spaces", GbR'2011 Mini-tutorial, dated 2011, 66 pages.
Gogoi, et al., "Packet and Flow Based Network Intrusion Dataset", dated 2012, 12 pages.
Kolosnjaji et al., "Deep Learning for Classification of Malware System Call Sequences", dated 2016, 12 pages.
Conneau et al. "Supervised Learning of Universal Sentence Representations from Natural Language Inference Data", Dated Jul. 21, 2017, 12 pages.
Wei et al., "Graph embedding based feature selection", Neurocomputing 93 dated May 17, 2012, 11 pages.
Klapper-Rybicka et al., "Unsupervised Learning in Recurrent Neural Networks", dated May 1, 2001, 11 pages.
Shiravi et al., "Toward Developing a Systematic Approach to Generate Benchmark Datasets for Intrusion Detection", dated Feb. 28, 2011, 18 pages.
Snoek et al., "Input Warping for Bayesian Optimization of Non-Stationary Functions", Proceedings of the 31 st International Conference on Machine Learning, Beijing, China, 2014, 9 pages.
Snoek et al., "Scalable Bayesian Optimization Using Deep Neural Networks", dated 2014, 10 pages.
Sutskever et al., "Sequence to Sequence Learning with Neural Networks", dated 2014, 9 pages.
Seleznyov et al., "Anomaly Intrusion Detection Systems: Handling Temporal Relations between Events", dated 1999, 12 pages.
Usama et al., "Unsupervised Machine Learning for Networking: Techniques, Applications and Research Challenges", dated Sep. 19, 2017, 37 pages.
Scholkopf et al. "Estimating the Support of a High-Dimensional Distribution", dated Nov. 27, 1999, 28 pages.
Xu et al. "Detecting Large-Scale System Problemd by Mining Console Logs", SOSP'09, Oct. 11-14, 2009, 15 pages.
Yamanishi et al., "Dynamic Syslog Mining for Network Failure Monitoring", KDD'05 Aug. 21-24, 2005, Chicago, Illinois, USA, 10 pages.
Yen et al., "Beehive: Large-Scale Log Analysis for Detecting Suspicious Activity in Enterprise Networks", ACSAC '13 dated Dec. 9-13, 2013, New Orleans, Louisiana, USA, 10 pages.
Yousefi-Azar et al., "Autoencoder-based Feature Learning for Cyber Security Applications", dated 2017, 8 pages.
Yuanzhong, Zhu, "Intrusion Detection Method based on Improved BP Neural Network Research", International Journal of Security and Its Applications vol. 10, No. 5 (2016) pp. 193-202.
Zhang et al., "Network Anomaly Detection Using One Class Support Vector Machine", Proceedings of the International MultiConference of Engineers and Computer Scientists 2008 vol 1, Mar. 19, 2008, 5 pages.
Tuor et al., "Deep Learning for Unsupervised Insider Threat Detection in Structured Cybersecurity Data Streams", dated Dec. 15, 2017, 9 pages.
Malhotra et al., "LSTM-based Encoder-Decoder for Multi-sensor Anomaly Detection", Presented at ICML 2016 Anomaly Detection Workshop, New York, NY, USA, 2016. Copyright 2016—5 pages.
Zhang et al., "Automated IT System Failure Prediction: A Deep Learning Approach", dated 2016, 11 pages.
Le et al., "Distributed Representations of Sentences and Documents", Proceedings of the 31 st International Conference on Machine Learning, Beijing, China, dated 2014, 9 pages.
Liu et al., "Detecting and Preventing Cyber Insider Threats: A Survey", IEEE Communications Survey & Tutorials, dated 2018, 21 pages.
Liu et al., "Isolation Forest", dated 2008, 10 pages.
Luo et al., "A Revisit of Sparse Coding Based Anomaly Detection in Stacked RNN Framework", dated Oct. 2017, 9 pages.
Shipmon et al., "Time Series Anomaly Detection", Detection of Anomalous Drops with Limited Features and Sparse Examples in Noisy Highly Periodic Data, dated 2017, 9 pages.
Malhotra et al., "Long Short Term Memory Networks for Anomaly Detection in Time Series", ESANN dated Apr. 22, 2015 proceedings, European Symposium on Artificial Neural Networks, 6 pages.
Klapper-Rybicka et al., "Unpervised Learning in LSTM Recurrent Neural Networks", dated 2001, 8 pages.
Mikolov et al., "Distributed Representations of Words and Phrases and their Compositionality", dated 2013, 9 pages.
Mikolov et al., "Efficient Estimation of Word Representations in Vector Space", dated Sep. 7, 2013, 12 pages.
Mikolov, Tomas, "Recurrent Neural Network Based Language Model", dated Jul. 20, 2010, 24 pages.
Mnih et al., "A Scalable Hierarchical Distributed Language Model", dated 2009, 8 pages.
Perozzi et al., "DeepWalk: Online Learning of Social Representations", dated 2014, 10 pages.
Ruder, Sebastian, "An Overview of Gradient Descent Optimization Algorithms", dated Jun. 15, 2017, 14 pages.
Maglaras et al. "A real time OCSVM Intrusion Detection module with low overhead for SCADA systems", International Journal of Advanced Research in Artificial Intelligence, vol. 3, No. 10, 2014, 9 pgs.
Zhu et al., "To prune, or not to prune: exploring the efficacy of pruning for model compression", dated 2017, 11 pages.
Xin, Guo "A New Approach Towards the Combined Algorithm Selection and Hyperparameter Optimization Problem", dated Jan. 28, 2019, 57 pages.
Thornton et al., "Auto-WEKA: Combined Selection and Hyperparameter Optimization of Classification Algorithms", New York, New York, dated Mar. 6, 2013, 9 pages.
Stamoulis et al., "HyperPower: Power- and Memory-Constrained Hyper-Parameter Optimization for Neural Networks", dated 2018, 7 pages.
Sprechmann et al., "Memory-Based Parameter Adaptation", Published as a conference paper at ICLR dated 2018, 16 pages.
Shohoni et al., "Low-Memory Neural Network Training: A Technical Report", Stanford University, dated Apr. 25, 2019, 38 pages.
Li et al., "Hyperband: A Novel Bandit-Based Approach to Hyperparameter Optimization", Journal of Machine Learning Research 18 (dated 2018) pp. 1-52.
Jomaa et al., "Dataset2Vec: Learning Dataset Meta-Features", dated May 5, 2019, 20 pages.
Hutter et al., "Sequential Model-Based Optimization for General Algorithm Configuration", Conference on the Theory and Applications of Cryptographic Techniques, dated Jan. 17, 2011. 17 pages.
Han et al., "Deep Compression: Compressing Deep Neural Networks With Pruning, Trained Quantization and Huffman Coding", Conference Paper at ICLR dated 2016, 14 pages.
Gelbart et al., "Bayesian Optimization with Unknown Constraints", dated 2014, 10 pages.
An et al., "Variational Autoencoder based Anomaly Detection using Reconstruction Probability", Feb. 2015 Special Lecture on IE, dated Dec. 27, 2015, 18 pages.
Snoek, "Practical Bayesian Optimization of Machine Learning Algorithms", dated 2012, 9 pages.
Scikit Learn, "3.2. Tuning the hyper-parameters of an estimator", http://scikitlearn.org/stable/modules/grid_search.html, dated 2017, 6 pages.
Maclaurin et al., "Gradient-based Hyperparameter Optimization through Reversible Learning", Proceedings of the 32nd International Conference on Machine Learning, Lille, France, dated 2015, 10 pages.

(56) References Cited

OTHER PUBLICATIONS

Gonzalez et al., "Batch Bayesian Optimization via Local Penalization", Proceedings of the 19th International Conference on Artificial Intelligence and Stats JMLR: W&CP vol. 41, dated 2016, 10 pages.
Feurer et al., "Initializing Bayesian Hyperparameter Optimization via Meta-Learning", Proceedings of the Twenty-Ninth AAAI Conference on Artificial Intelligence, dated Jan. 2015, 8 pages.
Bergstra et al., "Random Search for Hyper-Parameter Optimization", Journal of Machine Learning Research 13 (2012) 281-305, dated Feb. 2012, 25 pages.
Bergstra et al., "Making a Science of Model Search: Hyperparameter Optimization in Hundreds of Dimensions for Vision Architectures", JMLR: W &CP, vol. 28, dated 2013, 9 pages.
Andrychowicz et al., "Learning to learn by gradient descent by gradient descent", 30th Conference on Neural Information Processing Systems dated (NIPS 2016), Barcelona, Spain, 9 pages.
Varadarajan, U.S. Appl. No. 15/914,883, filed Mar. 7, 2018, Final Office Action, dated Mar. 2, 2021.
Peinador, U.S. Appl. No. 16/122,398, filed Sep. 5, 2018, Notice of Allowance, dated Apr. 29, 2021.
Idicula, U.S. Appl. No. 16/382,085, filed Apr. 11, 2019, Restriction Requirement, dated Jan. 29, 2021.
Idicula, U.S. Appl. No. 16/298,837, filed Mar. 11, 2019, Notice of Allowance, dated Feb. 18, 2021.
Hajimirsadeghi, U.S. Appl. No. 16/122,505, filed Sep. 5, 2018, Office Action, dated May 13, 2021.
Reif et al., "Prediction of Classifier Training Time including Parameter Optimization", dated Oct. 2011, 13 pages.
Peskova et al., "Hybrid Multi-Agent System for Metalearning in Data Mining", dated Sep. 19, 2014, 2 pages.
Lindne et al., "AST: Support for Algorithm Selection with a CBR Approach", Springer-Verlag Berlin Heidelberg 1999, 6 pages.
Lim et al., "A Comparison of Prediction Accuracy, Complexity, and Training Time of Thirty-Three Old and New Classification Algorithms", dated 2000, 26 pages.
Lemke et al., "Metalearning: a survey of trends and technologies", Artif Intell Rev dated 2015,14 pages.
Furnkranz et al., "An Evaluation of Landmarking Variants", dated 2001, 12 pages.
Filchenkjov et al., "Datasets Meta-Feature Description for Recommending Feature Selection Algorithm", dated Nov. 2015, 9 pages.
Feurer et al., "Initializing Bayesian Hyperparameter Optimization via Meta-Learning", Proceedings of the Twenty-Ninth AAAI Conference on Artificial Intelligence dated 2015, 8 pages.
Castiello et al., "Meta-data: Characterization of Input Features for Meta-learning", Springer-Verlag Berlin Heidelberg dated 2005, 13 pages.
Brazdil, Pavel, "Metalearning and Algorithm Selection: Progress, State of the Art and Introduction of the 2018 Special Issue", dated Dec. 2017, 23 pages.
Brazdil et al., "Ranking Learning Algorithms: Using IBL and Meta-Learning on Accuracy and Time Results", dated 2003 Kluwer Academic Publishers. Manufactured in The Netherlands, 27 pages.
Bensusan et al., "Discovering Task Neighbourhoods through Landmark Learning Performances", Springer-Verlag Berlin Heidelberg dated 2000, 6 pages.
Bensusan et al., "Casa Batlo is in Passeig de Gracia or how landmark performances can describe tasks", dated 2000, 19 pages.
Zhou et al., "Tree Kernel-based Relation Extraction with Context-Sensitive Structured Parse Tree Information", dated Jun. 2007, 9 pages.
Zhen Hua Liu et al. "JSON Data Management in RDBMS", Emerging Technologies and Applications in Data Processing and Management, dated May 13, 2019, pp. 20-45.
USPTO, "Public Views on Artificial Intelligence and Intellectual Property Policy", dated Oct. 2020, 56 pages.
Knut Anders Hatlen, "Partial Update of JSON Values", MySQL Server Blog, dated Apr. 3, 2018, 6 pages.
Collins et al., "Convolution Kernels for Natural Language", dated 2002, 8 pages.
Bryan P et al., "JavaScript Object Notation (JSON) Patch; rfc6902.txt", Javascript Object Notation (JSON) Patch, Internet Engineering Task Force, Standard, Internet Society, Apr. 3, 2013, 18 pages.
Bockermann, "Learning SQL for Database Intrusion Detection Using Context-Sensitive Modelling", DIMVA 2009, LNCS 5587, dated 2009, 10 pages.
Apel et al., "Learning SQL for Database Intrusion Detection using Context-sensitive Modelling", dated 2009, 33 pages.
Alon, et al., "code2vec: Learning Distributed Representations of Code", Proc. ACM Program. Lang., vol. 3, No. POPL, Article 40. Publication date: Jan. 2019, 29 pages.
Allandadian et al., "A Nonlinear Optimization Method with Focus", dated 2018, 1 page.
Weinberger et al., "Unsupervised learning of image manifolds by semidefinite programming", IEEE, dated Jun. 27, 2004, 10 pages.
Simpson et al., "Automatic Algorithm Selection in Computational Software Using Machine Learning", dated 2016, 10 pages.
Pinter, Janos, "Calibrating Artificial Neural Networks by Global Optimization", Technical Report, Özyeğin University, Istanbul Submitted for publication: Jul. 2010, 17 pages.
Kuck et al., "Meta-learning with neural networks and landmarking for forecasting model selection an empirical evaluation of different feature sets applied to industry data", dated Jul. 24-29, 2016, 8pgs.
Feurer et al. "Efficient and Robust Automated Machine Learning", dated 2015, 9 pages.
Doan et al., "Selecting Machine Learning Algorithms using Regression Models", https://www.researchgate.net/publication/304298580, dated Nov. 2015, 8 pages.
Doan et al., "Algorithm Selection Using Performance and Run Time Behavior", Chapter, Artificial Intelligence: Methodology, Systems and Applicationsm AIMSA dated Sep. 2016, pp. 3-13.
Bergstra et al., "Hyperparameter Optimization and Boosting for Classifying Facial Expressions: How good can a "Null" Model be?", ICML Workshop on Representation and Learning, dated 2013, 7 pages.
The International Searching Authority, "Search Report" in Application No. PCT/US2021/044093, dated Dec. 23, 2021, 13 pages.
Matthias Reif, et al., "Dataset Generation for Meta-Learning," 2012, pp. 69-73 .
Matthias Reif, et al., "Automatic Classifier Selection for Non-Experts," Feb. 2012, pp. 1-21.
M. Fatih Amasyalie et al., "A Study of Meta Learning for Regression," Jul. 1, 2009, 26 pages.
Current Claims in Application No. PCT/US2021/044093, dated Dec. 2021, 4 pages.
Christophe Giraud-Carrier, "New Insights into Learning Algorithms and Datasets," Jan. 2008, 7 pages.
Varadarajan, U.S. Appl. No. 15/914,883, filed Mar. 7, 2018, Final Rejection, dated Oct. 22, 2021.
Hajimirsadeghi, U.S. Appl. No. 16/122,505, filed Sep. 5, 2018, Notice of Allowance and Fees Due, dated Nov. 26, 2021.
Idicula, U.S. Appl. No. 16/382,085, filed Apr. 11, 2019, Notice of Allowance and Fees Due, dated Nov. 3, 2021.
Idicula, U.S. Appl. No. 16/382,085, filed Apr. 11, 2019, Office Action, dated May 19, 2021.
Varadarajan, U.S. Appl. No. 15/885,515, filed Jan. 31, 2018, Notice of Allowance, dated Jul. 26, 2021.
Varadarajan, U.S. Appl. No. 15/885,515, filed Jan. 31, 2018, Notice of Allowance, dated Aug. 4, 2021.
Varadarajan, U.S. Appl. No. 15/885,515, filed Jan. 31, 2018, Office Action, dated Jun. 17, 2021.
Hajimirsadeghi, U.S. Appl. No. 16/122,505, filed Sep. 5, 2018, Notice of Allowance and Fees Due, dated Sep. 23, 2021.
Varadarajan, U.S. Appl. No. 15/914,883, filed Mar. 7, 2018, Advisory Action, dated Dec. 13, 2021.
Yakovlev, U.S. Appl. No. 16/384,588, filed Apr. 15, 2019, Non-Final Rejection, dated Sep. 16, 2021.
Varadarajan, U.S. Appl. No. 15/914,883, filed Mar. 7, 2018, Non-Final Rejection, dated Aug. 17, 2021.
Varadarajan, U.S. Appl. No. 15/914,883, filed Mar. 7, 2018, Non-Final Rejection, dated Jan. 20, 2022.
Varadarajan, U.S. Appl. No. 16/137,719, filed Sep. 21, 2018, Interview Summary, dated Jul. 9, 2021.

(56) References Cited

OTHER PUBLICATIONS

Varadarajan, U.S. Appl. No. 16/137,719, filed Sep. 21, 2018, Notice of Allowance, dated Jul. 9, 2021.
Varadarajan, U.S. Appl. No. 16/137,719, filed Sep. 21, 2018, Notice of Allowance, dated Aug. 4, 2021.
Yakovlev, U.S. Appl. No. 16/384,588, filed Apr. 15, 2019, Final Rejection, dated Jan. 18, 2022.
Varadarajan, U.S. Appl. No. 15/914,883, filed Mar. 7, 2018, Advisory Action, dated Jun. 28, 2021.
Peinador, U.S. Appl. No. 16/122,398, filed Sep. 5, 2018, Office Action, dated Oct. 28, 2020.
Idicula, U.S. Appl. No. 16/298,837, filed Mar. 11, 2019, Office Action, dated Sep. 3, 2020.
Yogatama et al., "E cient Transfer Learning Method for Automatic Hyperparameter Tuning", Proceedings of the 17th International Conference on Artifical Intelligence and Statistics dated 2014, 9 pages.
Swersky et al., "Multi-Task Bayesian Optimization", dated 2013, 9 pages.
Kim et al., "Learning to Transfer Initializations for Bayesian Hyperparameter Optimization", 31st Conference on Neural Information Processing Systems dated 2017, Long Beach, CA, USA, 5 pages.
Feurer et al., "Using Meta-Learning to Initialize Bayesian Optimization of Hyperparameters", dated 2014, 8 pages.
Feurer et al., "Initializing Bayesian Hyperparameter Optimization via Meta-Learning", dated 2015, 8 pages.
Bardenet et al., "Collaborative hyperparameter tuning", Proceedings of the 30 th International Conference on Machine Learning, Atlanta, Georgia, USA, 2013, 9 pages.
Mirza Ali H et al., "Computer Network Intrusion Detection Using Sequwnrial LSTM Neural Networks Autoencoders", dated May 2, 2018, 2018 26th Signal Processing and Communicaitons Applications Con. 4 pgs.
Loganathan Gobinath et al., "Sequence to Sequence Pattern Learning Algorithm for Real-Time Anomaly Detection in Network Traffic", dated 2018 IEEE, dated May 13, 2018, pp. 1-4.
Mendes-Moreira et al., "Ensemble Approaches for Regression", ACM Computing Surveys, ACM, New York, NY vol. 45, No. 1, dated Dec. 7, 2012, pp. 1-40.
B. Debnath et al., SARD: A statistical approach for ranking database tuning parameters. In ICDEW, pp. 11-18, dated 2008, 8 pages.
Caruana et al., "Ensemble Selection From Libraries of Models", Proceedings, Twenty-First International Conference on Machine Learning: dated Jul. 2004, 8 pages.
Chen Chi-Ou et al., "Machine Learning-Based Configuration Parameter Tuning on Hadoop System", dated Jun. 27, 2015, IEEE, pp. 386-392.
Duan et al., "Tuning Database Configuration Parameters with iTuned", VLDB dated 2009, 12 pages.
Ganapathi, A. et al. "Predicting multiple performance metrics for queries: Better decisions enabled by machine learning", ICDE 2009, 12 pages.
Gonnet et al., Automatic Problem-Specific Hyperparameter Optimization and Model Selection for Supervised Machine Learning, Technical Report, dated Jan. 1, 2015, 54 pages.
Aldave et al., "Systematic Ensemble Learning fro Regression" dated Mar. 28, 2014, pp. 1-38.
Jennie Duggan et al., ". Modeling and Prediction of Concurrent Query Performance". SIGMOD, dated 2011, 12 pages.
Zilio, D.C.A. "DB2 design advisor: integrated automatic physical database design" VLDB dated 2004, Proceedings of the Thirtieth international conference on Very large data bases, 11 pages.
Narayanan et al., "Continuous resource monitoring for self-predicting DBMS", IEEE International Symposium on Modeling, Analysis and Simulation of Computer and Telecommunication Systems, 2005, 10 pages.
Nelder et al., "A Simplex Method for Function Minimization", The Computer Journal, vol. 7, dated Apr. 1, 1964, pp. 308-313.
Pedregosa, Fabian, "Hyperparameter Optimization with Approximate Gradient", Proceedings of the 33rd International Conference on Machinelearning, New York, vol. 48, dated Jun. 26, 2016, pp. 1-15.
Reif et al., "Meta-learning for evolutionary parameter optimization of classifiers, Machine Learning", dated 2012, 24 pages.
Sullivan et al., "Using probabilistic reasoning to automate software tuning", In SIGMETRICS, dated 2004, 13 pages.
Van Aken et al., "Automatic Database Management System Tuning Through Large-scale Machine Learning," Proceedings of the 2017 ACM International Conference on Management of Data, 2017, pp. 1009-1024.
J.D Wichard, "Model Selection in an Ensemble Framework", The 2013 International Joint Conference on Neural Networks, dated Jan. 1, 2006, pp. 2187-2192.
Wolfram MathWorld, "Inner Product", https://mathworld.wolfram.com/InnerProduct.html, dated 2004, 2 pages.
Hadi S. Jomaa et al., "Dataset2Vec: Learning Dataset Meta-Features," May 27, 2019, 13 pages.
Duggan, et al., 'Performance Prediction for Concurrent Database Workloads', p. 337-348, SIGMOD'11, Jun. 12-16, 2011, Athens, Greece, 12pgs.
Lin et al., "Experiencing SAX: a novel symbolic representation of time series", dated Apr. 3, 2007, 38 pages.
Abe et al., "Developing an Integrated Time-Series Data Mining Environment for Medical Data Mining", Seventh IEEE International Conference on Data Mining—Workshops, dated 2007, 6 pages.
Ahmed et al., "An Empirical Comparison of Machine Learning Models for Time Series Forecasting", dated Sep. 15, 2010, 31 pages.
Amazon Sage Maker, "DeepAR Forecasting Algorithm", https://docs.aws.amazon.com/sagemaker/latest/dg/deepar.html,last viewed on Jun. 29, 2020, 5 pages.
Artificial Intelligence Blog, "Announcing automated ML capability in Azure Machine Learning", dated Sep. 24, 2018, 8 pages.
Brownlee, Jason, "Time Series Forecasting as Supervised Learning", dated Aug. 21, 2019, 2 pages.
Camerra et al., "Beyond one billion time series: indexing and mining very large time series collections with iSAX2+", dated Feb. 16, 2013, 29 pages.
"Machine Learning Approaches for Time Series Data" dated May 19, 2019, 25 pages.
Kraska, Tim, "Northstar: An Interactive Data Science System", Proceedings of the VLDB Endowment, vol. 11, No. 12 Copyright 2018 VLDB Endowment, 15 pages.
Wang et al., "Experimental comparison of representation methods and distance measures for time series data", dated Feb. 12, 2010, 35 pages.
Ng, "Data preprocessing for machine learning: options and recommendations", dated Jun 22, 2020, 12 pages.
Olson et al., "Evaluation of a Tree-based Pipeline Optimization Tool for Automating Data Science", dated Mar. 20, 2016, 8 pages.
Oracle, "The Oracle AutoML Pipeline" Four Main Stages, https://docs.cloud.oracle.com/en-us/iaas/tools/ads-sdk/latest/user_guide/automl/overview.html, dated Apr. 28, 2020 or later, 4 pages.
Paoli et al., "Forecasting of preprocessed daily solar radiation time series using neural networks", Solar Energy, Elsevier, dated 2010, 43 pages.
Plotz et al., "Feature Learning for Activity Recognition in Ubiquitous Computing", dated Jan. 2011, 7 pages.
Schoenfeld et al., "Preprocessor Selection for Machine Learning Pipelines", dated 2018, 7 pages.
Song et al., "Deep r-th Root of Rank Supervised Joint Binary Embedding for Multivariate Time Series Retrieval", KDD 2018, dated Aug. 19-23, 2018, London, United Kingdom, 10 pages.
Faloutsos et al., "Fast Subsequence Matching in Time Series Databases", dated 1998, 11 pages.
Bergstra et al., "Hyperopt: A Python Library for Optimizing the Hyperparameters of Machine Learning Algorithms", Proc. of the 12th Python in Science Conf. (SCIPY 2013), dated 2013, 8 pages.
Wistuba et al., "Scalable Guassian process-based transfer surrogates for hyperparameter optimization", Machine Learning, 107(1), 2017, 36 pages.

(56) References Cited

OTHER PUBLICATIONS

Wistuba et al., "Learning Hyperparameter Optimization Initializations", IEEE, 2015, 10 pages.

* cited by examiner

ALGORITHM-SPECIFIC NEURAL NETWORK ARCHITECTURES FOR AUTOMATIC MACHINE LEARNING MODEL SELECTION

BENEFIT CLAIM

This application claims the benefit under 35 U.S.C. § 119(e) of provisional application 62/565,009, filed Sep. 28, 2017, the entire contents of which is hereby incorporated by reference for all purposes as if fully set forth herein.

FIELD OF THE DISCLOSURE

This disclosure relates to machine meta-learning. Presented herein are techniques for optimal selection of machine learning algorithms based on performance predictions by trained algorithm-specific regressors, and techniques for training the regressors and/or ensembles of regressors.

BACKGROUND

Machine learning is used in a variety of applications and domains such as healthcare, Internet of Things (IOT), finance, and security. Decades of research have created a huge assortment of algorithms and techniques that can be applied to these applications. Selecting the best algorithm for an application may be difficult and resource intensive. For example, a classification task can be done by several algorithms such as support vector machines (SVMs), random forests, decision trees, artificial neural networks, and more. Each of these algorithms has many variations and configurations and performs differently for different datasets. Choosing the best algorithm is typically a manual task performed by a data scientist or a machine learning expert having years of experience.

Some automatic algorithm selection techniques incur significant computational overhead, such as during product research and development (R&D), which can prolong a time to market. There are hundreds of machine learning algorithms. Training and testing each one to find the best performing might not be feasible. Automatic approaches to selective training typically ultimately use a single regressor/classifier for predicting algorithm performance, which causes different algorithms to interfere with each other in the selection model, thereby lowering accuracy. These approaches also do not consider algorithm hyperparameters, which can significantly affect algorithm performance and behavior.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Example Computer
        2.1 Machine Learning Algorithms
        2.2 Meta-Models
        2.3 Hyperparameters
        2.4 Meta-Features
        2.5 Inference Dataset
        2.6 Inferencing
        2.7 Scores
        2.8 Result
    3.0 Example Selection Process
        3.1 Preparation
        3.2 Scoring
        3.3 Selecting
    4.0 Meta-Learning
        4.1 Ensembles
        4.2 Ensemble Score
        4.3 Softmax
        4.4 Performance Tuples
        4.5 Model Versus Meta-Model
        4.6 Model Testing
        4.7 Meta-Model Training
        4.8 Competing Algorithm-Specific Ensembles
        4.9 Training Dataset Partitioning
    5.0 Example Meta-Learning Process
        5.1 Preparing
        5.2 Modeling
        5.3 Ensemble Training
    6.0 Value Translation
        6.1 Raw Data
        6.2 Categories
        6.3 One-Hot Encoding
        6.4 Numbers
        6.5 Zero-Mean
        6.6 Unit-Variance
        6.7 Normalization 7.0 Meta-Optimization
   7.1 Variance
   7.2 Bias
   7.3 Bootstrap Aggregating
   7.4 Feature Bagging
   7.5 Sample Bagging
   7.6 Dataset Partitioning
   7.7 Overlap
   7.8 Boosting
   7.9 Ensemble Optimization
8.0 Hardware Overview
9.0 Software Overview
10.0 Cloud Computing
1.0 General Overview Techniques are provided herein for optimal selection of machine learning algorithms based on performance predictions by trained algorithm-specific regressors. In an embodiment, a computer derives meta-feature values from an inference dataset by, for each meta-feature, deriving a respective meta-feature value from the inference dataset. For each trainable algorithm and each regression meta-model that is respectively associated with the algorithm, a respective score is calculated by invoking the meta-model based on at least one of: a) a respective subset of meta-feature values, and/or b) hyperparameter values of a respective subset of hyperparameters of the algorithm. One or more of the algorithms are selected based on the respective scores. Based on the inference dataset, the one or more algorithms may be invoked to obtain a result.

In an embodiment, the trained regressors are distinctly configured artificial neural networks. In an embodiment, the trained regressors are contained within algorithm-specific ensembles. Techniques are also provided herein for optimal training of regressors and/or ensembles.

2.0 Example Computer

Figure 1:
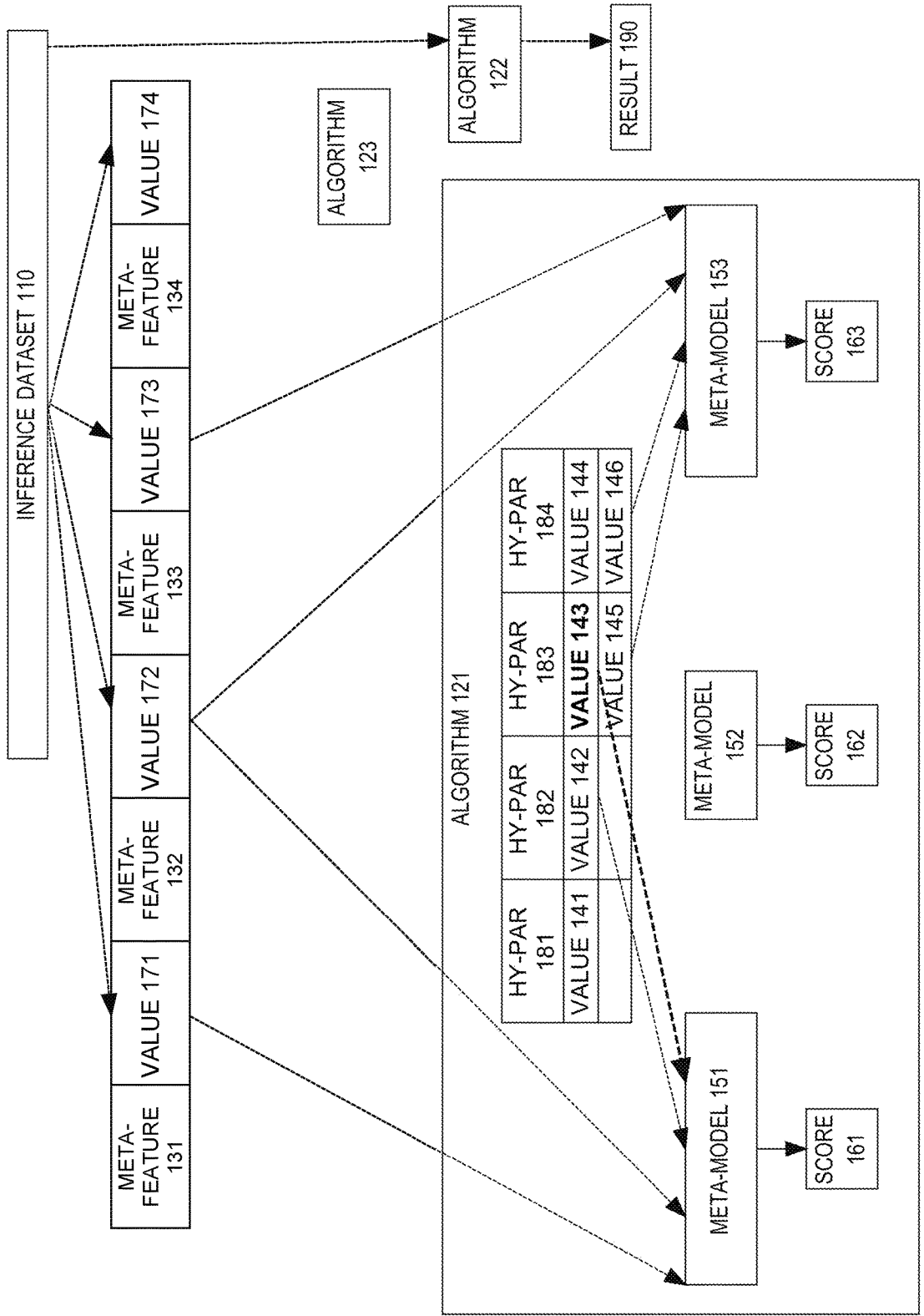
FIG. 1 is a block diagram that depicts an example computer that optimally selects trainable algorithms based on performance predictions by trained regressors, in an embodiment.

FIG. 1 is a block diagram that depicts an example computer 100, in an embodiment. Computer 100 optimally selects trainable algorithms based on performance predictions by trained regressors. Computer 100 may be one or more computers such as an embedded computer, a personal computer, a rack server such as a blade, a mainframe, a virtual machine, or any computing device that uses scratch memory during numeric and symbolic processing.

2.1 Machine Learning Algorithms

Computer 100 contains or accesses specifications of multiple distinct trainable machine learning algorithms, such as 121-123, each of which may perform analysis such as classification, regression, clustering, or anomaly detection. For example, algorithm 121 may be a support vector machine (SVM) or an artificial neural network (ANN), and algorithm 122 may be a decision tree or a random forest.

Each of algorithms 121-123 is trainable and perhaps due for tuning (retraining) or not yet trained. Each of algorithms 121-123 may or may not be ready (trained) for immediate use on inference dataset 110. Inference dataset 110 may be empirical data, either exhaustive or representative, that any of algorithms 121-123 may eventually use for training or inference such as data mining.

Training any one algorithm of 121-123 is computationally very expensive, which may be aggravated by the amount of raw data in inference dataset 110. Computational feasibility may require that computer 100 (or another computer) train only one or a small subset of algorithms 121-123.

Ideally, computer 100 would select (for training and/or inference) a few of algorithms 121-123 that could produce the best (most accurate, least error) results with inference dataset 110. However, because some or all of algorithms 121-123 may still need training or retraining, accuracy prediction for algorithms 121-123 may be difficult or impossible.

Accuracy prediction may be further aggravated by the amount of available algorithms such as 121-123. Machine learning has hundreds of algorithms and is still rapidly growing. Many of these algorithms are readily available in reusable libraries such as TensorFlow and scikit-learn.

2.2 Meta-Models

Computer 100 creates or obtains meta-models for each of algorithms 121-123 to quickly and accurately predict the performance of each algorithm. For example, computer 100 may create meta-models 151-153 as performance predictors of algorithm 121.

Each of meta-models 151-153 is itself an instance of trainable regression algorithm, although not the same algorithm for which the meta-models are trained for. For example, meta-models 151-153 may each be a distinct neural network that is already trained to predict the performance of algorithm 121, which may be support vector machine instead of a neural network. Training of meta-models is discussed later herein.

In operation, computer 100 obtains inference dataset 110 and should use meta-models, such as 151-153, to select a more or less optimal subset of algorithms 121-123 to eventually be tuned with inference dataset 110. When predicting performance of an algorithm, a meta-model should consider features of the algorithm and features of inference dataset 110.

2.3 Hyperparameters

Features of an algorithm are referred to as hyperparameters. For example, algorithm 121 has hyperparameters 181-184.

If algorithm 121 is a support vector machine, then hyperparameters typically include C and gamma. If algorithm 121 is a neural network, then hyperparameters may include features such as a count of layers and/or a count of neurons per layer.

Each of algorithms 121-123 may have many configuration alternatives based on hyperparameter values. For example, each distinct configuration of algorithm 121 is based on a distinct set of values for hyperparameters 181-184.

Each of hyperparameters 181-184 may logically be a separate axis in a multidimensional hyperspace. Each distinct configuration of algorithm 121 corresponds to a distinct point in that hyperspace.

Some of hyperparameters 181-184 may be continuous variables, meaning that even a tiny subrange of such a hyperparameter may contain an infinite amount of points. Due to such intractable combinatorics, computer 100 should not consider many or most of the points in the hyperspace.

Instead, computer 100 may intelligently or randomly sample the hyperspace to limit which configuration alternatives of algorithm 121 does computer 100 actually predict performance for. For each actual configuration alternative or set of related configuration alternatives, computer 100 has a separate meta-model, such as 151-153.

Each of meta-models 151-153 was trained to predict how a particular configuration (or set of related configurations) of algorithm 121 will perform for a variety of datasets that are similar or dissimilar to inference dataset 110. Related configurations are those that have identical or similar values for a subset of hyperparameters 181-184.

For example, meta-model 151 was trained by observing the performance of instances of algorithm 121 that had configurations that had identical or similar values for hyperparameters 182-183. Thus, dashed arrows lead from values 142-143 to meta-model 151.

Values 143 and 145 are dissimilar values of hyperparameter 183. For example, hyperparameter 183 may be a count of layers in a neural network, and inference dataset 110 may be a collection of photographs, such that analysis of monochrome photos needs fewer layers than for full-color photos.

The diverging dashed arrows that lead from values 143 and 145 to respective meta-models 151 and 153 may show that meta-model 151 was trained by observing the performance of algorithm 121 configured with fewer layers for monochromatic photography and meta-model 153 was trained by observing the performance of algorithm 121 configured with more layers for full-color photography.

2.4 Meta-Features

Features of a dataset itself as a whole are referred to as meta-features. For example, inference dataset 110 has meta-features 131-134.

For example if inference dataset 110 is a collection of photographs, then meta-feature 131 may be a count of photographs or an arithmetic mean of pixels per photo, and meta-feature 132 may be a statistical variance of all pixel luminosities of all of the photos or median count of edges of all photos, which may be somewhat rigorous to calculate.

Unlike hyperparameters that may have many values, such as values 144 and 146 for hyperparameter 184, each meta-feature has at most one value. For example, meta-feature 131 has value 171.

Some meta-features may be applicable to some but not all datasets. For example, some meta-features may naturally lack values for inference dataset 110. For example, a meta-feature for a statistically modal haircut style may lack a value if none of the photographs of inference dataset 110 contain people.

2.5 Inference Dataset

Meta-feature values 171-174 may characterize inference dataset 110, such that somewhat similar datasets (such as monochrome photos) should have somewhat similar meta-feature values (such as color count). Likewise, different configuration alternatives of algorithm 121 may be more suited or less suited for analyzing different categories of datasets.

For example, meta-model 151 may correspond to one set of hyperparameter values that performed well for monochrome photos, and meta-model 153 may correspond to another set of hyperparameter values that performed well for full-color photos. If inference dataset 110 mostly contains monochrome photos, then meta-model 151 should indicate better suitability of its hyperparameter values.

2.6 Inferencing

Whereas with mostly photos of full-color, meta-model 153 should indicate better suitability of its hyperparameter values. Thus, by stimulating already-trained meta-models with respective subsets of hyperparameter values and meta-feature values of a new (unfamiliar) inference dataset such as 110, computer 100 may detect how suitable are various hyperparameter configurations of various algorithms 121-123.

Thus, computer 100 can spontaneously match trainable algorithms and their alternate configurations to particular unfamiliar datasets. Thus, computer 100 (or a downstream computer) can efficiently limit training to an optimal subset of contextually promising algorithms (and configurations) based on the dataset.

For example, meta-models 151-153 may each be an already trained neural network that takes a subset of hyperparameter values and a subset of meta-feature values as stimulus inputs, shown as dashed arrows entering meta-models 151-153. Training of meta-models is discussed later herein.

In an embodiment, the dashed arrows entering meta-models 151-153 from hyperparameter values (not meta-feature values) indicate actual values used to train meta-models 151-153. In an embodiment, those particular dashed arrows indicate actual values used to stimulate meta-models 151-153 after training during inferencing for algorithm selection. In an embodiment, those particular dashed arrows indicate actual values used for both training and inferencing. In an embodiment, default hyperparameter values (not shown) are instead used during inferencing. Thus in many embodiments, inferencing need not reuse the same hyperparameter values that were used for training a same meta-model.

2.7 Scores

Meta-models 151-153 are already trained regressors that process inputs to emit a comparative suitability score. For example, meta-model 151 emits score 161.

Scores 161-163 share a performance measurement scale. For example, a score may predictively measure how proficient (accuracy such as error rate) would a particular configuration of a particular algorithm become after training for a fixed duration with a particular training dataset, for which inference dataset 110 is representative (e.g. small sample) of the training dataset.

Likewise, a score may instead predictively measure how much time does a particular configuration of a particular algorithm need to achieve a fixed proficiency for a particular training data set. Instead, a score may simply be a comparative measure of abstract suitability.

Regardless of score semantics, each meta-model of each algorithm emits a score. Computer 100 may select the best one or few algorithms (perhaps also best hyperparameter values), such as 122 as shown, as ranked based on sorted scores.

2.8 Result

Computer 100 (or a downstream computer) may then use selected algorithm 122 to achieve a result, such as 190. For example, computer 100 may use inference dataset 110 (or a larger dataset that includes 110) to actually train one or a few alternate configurations of algorithm 122. For example, result 190 may be a well configured and well trained instance of algorithm 122 that is ready for production use.

The techniques herein improve the performance of computer 100 itself in various ways. By pruning the hyperparameter hyperspace, training of an excessive count of hyperparameter configurations is avoided. By selecting well suited algorithms and/or their configurations, training of an excessive count of different algorithms is avoided. By scoring based on fitness for actual dataset meta-feature values, contextual suitability of selection is increased.

Thus, subsequent training (e.g. by computer 100) occurs faster. Likewise, the trained selected algorithm(s) achieve higher accuracy in production use (e.g. by computer 100). Thus, computer 100 is accelerated as an algorithm training computer and is more reliable (accurate) as a production inference computer. By reducing the computational burden of these activities, the techniques herein are accelerated (save time) and save energy.

3.0 Example Selection Process

Figure 2:
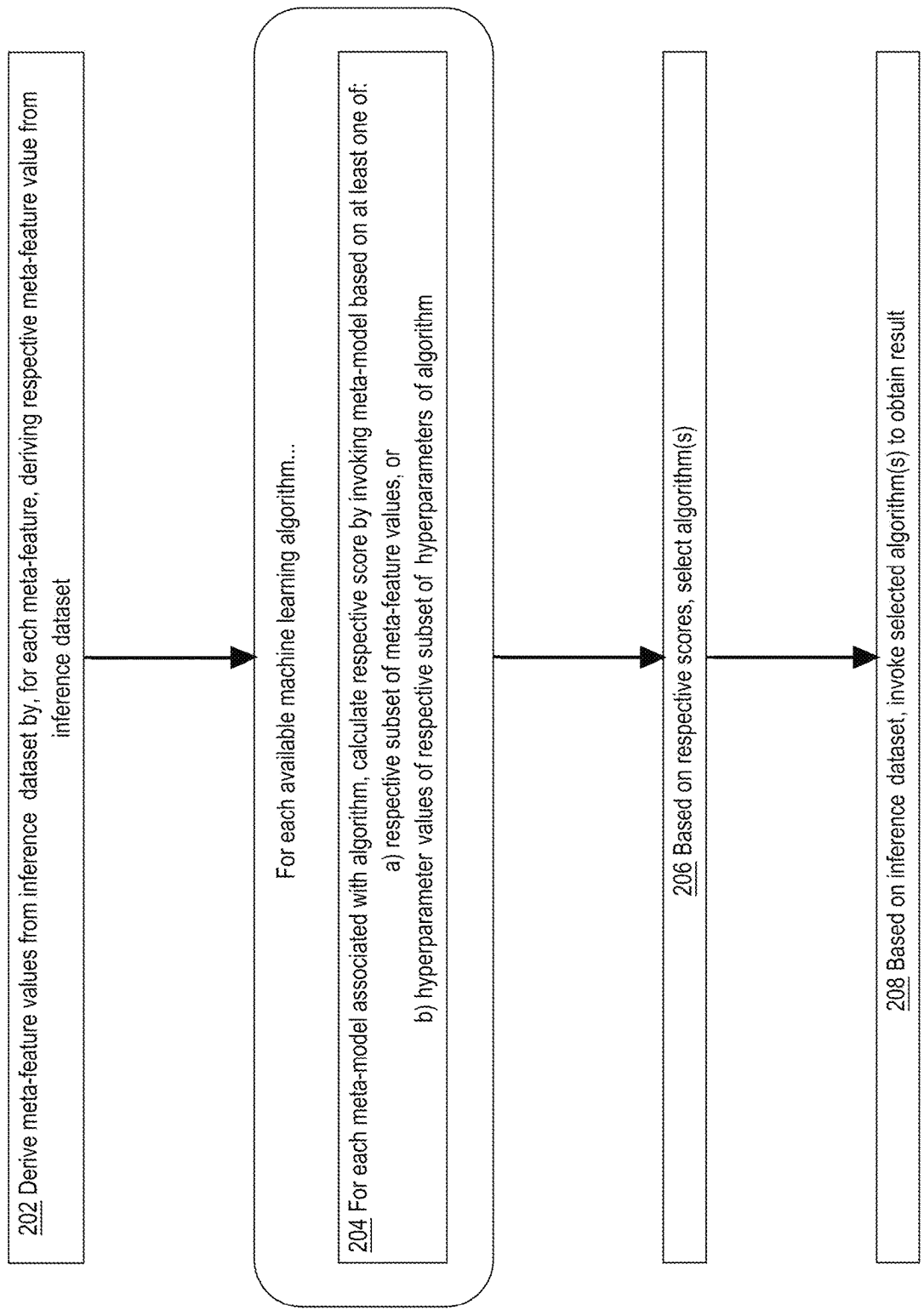
FIG. 2 is a flow diagram that depicts an example process for optimally selecting trainable algorithms based on performance predictions by trained regressors, in an embodiment.

FIG. 2 is a flow diagram that depicts computer 100 optimally selecting trainable algorithms based on performance predictions by trained regressors, in an embodiment. FIG. 2 is discussed with reference to FIG. 1.

3.1 Preparation

Step 202 is preparatory. In step 202, meta-feature values are derived from an inference dataset by, for each meta-feature, deriving a respective meta-feature value from the inference dataset. For example, meta-features 131-134 may be predefined by human experts as aspects that are generally obtainable from many or all datasets of some application.

For example, most application datasets consist of data units such as pixels, photographs, or tuples (e.g. database table rows). To the extent that a machine learning algorithm may have some configurations that adequately learn with little training data and other configurations that more accurately learn with much training data, one useful meta-feature may be the size of the dataset, such as a count of rows, pixels, or photographs.

Meta-feature values 171-174 may be extracted or synthesized from inference dataset 110. Thus, the character of inference dataset 110 may be known.

3.2 Scoring

Step 204 is repeated for each trainable algorithm that is available to computer 100. For each meta-model associated with a same algorithm, step 204 calculates a respective score by invoking the meta-model based on at least one of: a) a respective subset of meta-feature values, or b) hyperparameter values of a respective subset of hyperparameters of algorithm.

For example, already-trained distinct meta-models 151-153 may be individually stimulated with a respective subset of meta-feature values 171-174 and a respective subset of hyperparameter values 141-146 as inference inputs. For example, meta-model 151 calculates score 161 based on meta-feature values 171-172 and hyperparameter values 142-143.

3.3 Selecting

After step 204 is sufficiently repeated, all meta-models of all algorithms 121-123 have scores. Based on those scores, at least one promising algorithm is selected for training. For example, computer 100 selects algorithm 122 that has the highest scoring meta-model of all algorithms or the highest mean, median, or modal score of all algorithms.

Based on the inference dataset, step 208 invoked the selected algorithm(s) to obtain a result. This may or may not entail training at least one model (distinctly configured instance) of the selected algorithm.

Step 208 may finish by invoking the trained model(s) of the selected algorithm to obtain a result. For example, the result may be a classification/recognition of an object within inference dataset 110 or a larger dataset.

An explanation that distinguishes a model from a meta-model of an algorithm is discussed later for FIG. 3. Training models and metamodels is also discussed later for FIGS. 3-4 and 6.

4.0 Meta-Learning

Figure 3:
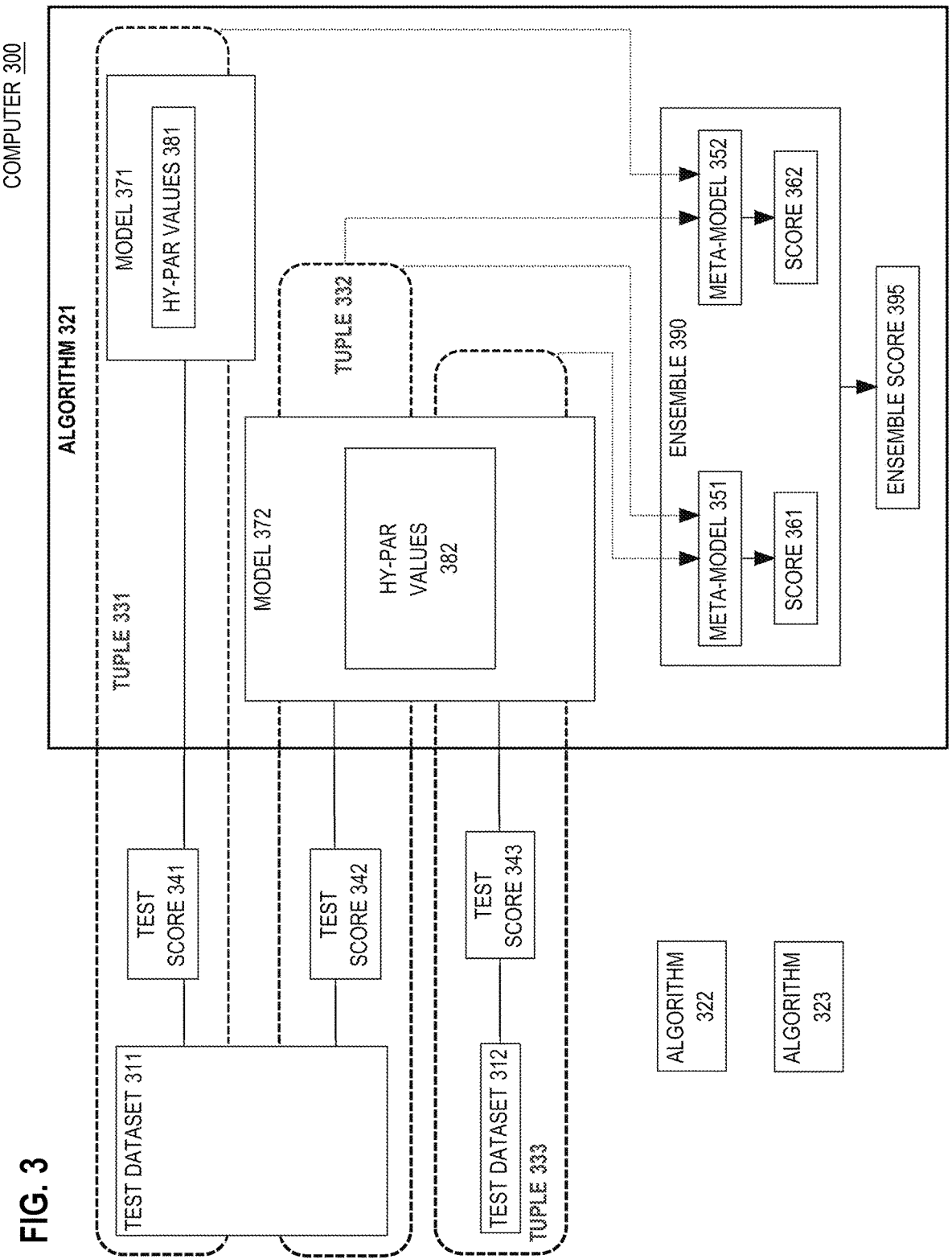
FIG. 3 is a block diagram that depicts an example computer that trains an algorithm-specific machine learning ensemble for contextually accurate performance prediction, in an embodiment.

FIG. 3 is a block diagram that depicts an example computer 300, in an embodiment. Computer 300 trains an algorithm-specific machine learning ensemble for contextually accurate performance prediction. Computer 300 may be an implementation of computer 100.

4.1 Ensembles

Computer 300 contains configurable trainable algorithms 321-323. Each algorithm is associated with its own machine learning ensemble, such as 390.

Ensemble 390 is trainable because it contains trainable meta-models 351-352. Each of meta-models 351-352 corresponds to at least a subset of hyperparameters and/or hyperparameter values of algorithm 321.

4.2 Ensemble Score

When meta-model 351-352 is stimulated with same input values, respective performance prediction scores 361-362 is generated. Ensemble 390 integrates scores 361-362 to synthesize ensemble score 395, which is ensemble 390's performance prediction score, which statistically is accurate more often than either of scores 361-362 individually.

4.3 Softmax

In an embodiment, scores 361-362 are averaged to synthesize ensemble score 395. In an embodiment, a (normalized exponential) softmax function integrates scores 361-362 to synthesize ensemble score 395. Unlike a statistical mean, a softmax function may use sigmoidal normalization to reduce distortion caused by outlying (deviant) scores, which may suppress meta-model(s) when they are noisy.

Although not shown, ensemble 390 may itself be a composite neural network that contains the neural networks of meta-models 351-352. Ensemble 390 may have an additional final layer that applies softmax to scores 361-362 to calculate ensemble score 395.

4.4 Performance Tuples

Ensemble 390 is trained with performance tuples 331-333 in sequence as inputs. Each of tuples 331-333 is a historical record of the performance of algorithm 321 when configured with particular hyperparameter values, trained, and then tested with a particular test dataset.

For example, tuple 332 has test score 342 that occurred when algorithm 321 was configured with hyperparameters 382, trained with a training dataset (not shown), and then tested with test dataset 311 to generate test score 342. Each machine learning model, such as 371-372, is a trained instance of algorithm 321 that was configured with respective hyperparameter values, such as 381-382 respectively.

4.5 Model Versus Meta-Model

All of models 371-372 and meta-models 351-352 are trained and/or trainable. However, models 371-372 are instances of algorithm 321 and trained with actual application training data. Whereas, meta-models 351-352 are instances of a different algorithm.

For example, algorithm 321 and models 371-372 may be support vector machines (SVMs), and meta-models 351-352 may be neural networks that predict the performance of those SVMs. After configuring and training models 371-372, they are tested with test datasets 311-312 to generate scores 341-343.

4.6 Model Testing

A test dataset is reusable across multiple tests to generate multiple test scores. For example, models 371-372 may both be tested with test dataset 311 to produce test scores 341-342 respectively.

A model is reusable across multiple tests to generate multiple test scores. For example, model 372 may be tested with test datasets 311-312 to produce test scores 343-343 respectively.

For each test, a tuple is recorded that references the variables of the test, which may include the identity of the test dataset, the test score, the hyperparameter values, and the identity of the algorithm or the model. For example, tuple 332 records that algorithm 321 was configured with hyperparameter values 382 to create and train machine learning model 372 that produced test score 342 when tested with test dataset 311.

Tuples 331-333 may be stored in volatile memory or durably, such as in a relational database or disk file. After model training and testing that generates tuples 331-333, the tuples are used as inputs for training ensemble 390.

4.7 Meta-Model Training

For each tuple during ensemble training, hyperparameter values may be obtained from the tuple, and meta-feature values may be obtained directly or indirectly from the training set of the tuple. In an embodiment, those values obtained for the tuple may be used to select one or some of meta-models 351-352 for training based on those values or subranges of values that included those values. In an embodiment, those values are used to train all of meta-models 351-352.

Those values are injected as stimulus input into some or all meta-models for training. Thus, meta-models 351-352 and ensemble 390 may learn to predict the performance of algorithm 321 and/or models 371-372.

4.8 Competing Algorithm-Specific Ensembles

Although not shown, algorithms 322-323 each also has its own trainable ensemble. Because each ensemble (and its meta-models) is trained for a separate algorithm, each ensemble learns to predict the performance of its own algorithm very well and without cross-training interference that would otherwise be caused by having to learn the contradictory performance quirks of multiple distinct algorithms.

Thus during inferencing after ensemble training, computer 300 may invoke multiple ensembles to detect how well each algorithm would perform for a same unfamiliar inference dataset. For example, computer 300 may select one or a few algorithms with the best ensemble score(s) for subsequent expensive training with an unfamiliar training dataset for which the inference dataset is representative. Thus, expensive training of algorithms with unpromising ensemble scores for that inference dataset may be avoided without loss of optimality.

4.9 Training Dataset Partitioning

In an embodiment, cross validation such as k-fold cross validation is used to create many pairs of training dataset and test dataset from one original training dataset, such that each pair contains the original training dataset but partitioned between training dataset and test dataset in different ways.

Likewise, some meta-models may be reserved (dedicated) for training with only a particular subset of hyperparameters, meta-features, values, and/or value subranges. Tuples whose values do not correlate with those expectations of a particular meta-model may be skipped while training that meta-model. A tuple may be skipped while training that meta-model if the tuple is missing a value that the meta-model expects.

In an embodiment, meta-features that are missing a value in a percentage of the distinct tuples (all tuples or one meta-model's bagged tuples as explained later for FIG. 6) that exceeds a threshold are excluded. In an embodiment, individual tuples (all tuples or one meta-model's bagged tuples) that are missing a value are excluded.

For example with tuples 331-333, only 332 is suitable for training both meta-models 351-352 as indicated by the dotted arrows flowing into meta-models 351-352. Multiple meta-models that accept a same shared tuple, such as 332, may take different subsets of (hyperparameter and meta-feature) values that are associated with the shared tuple.

Because meta-models 351-352 are trained with somewhat dissimilar subsets of tuples and somewhat dissimilar subsets of values from shared tuples, meta-models 351-352 are actually trained with different data. Thus, meta-models 351-352 actually are distinct after training, even if originally configured identically (e.g. same layer count). Thus, ensemble 390 integrates an actual diversity of predictions. Training dataset partitioning is further discussed below for FIG. 6.

Training multiple models and meta-models of multiple algorithms is computationally intensive and amenable to horizontal scaling for acceleration. For example, each computer of a cluster may train one or a few models or meta-models in tandem. Because training and especially testing of each model may be concurrent, tuples may be concurrently generated.

5.0 Example Meta-Learning Process

Figure 4:
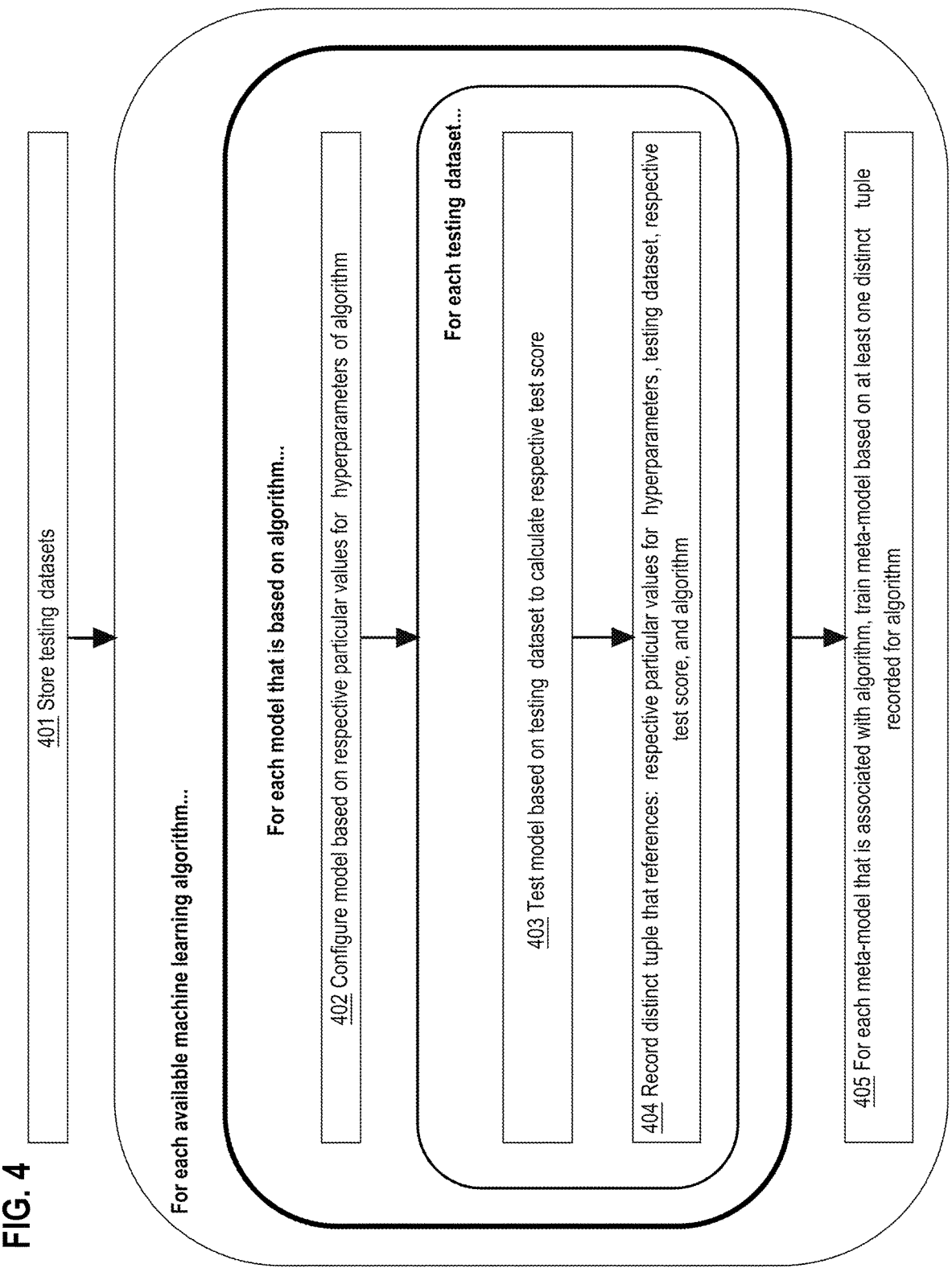
FIG. 4 is a flow diagram that depicts an example process for training an algorithm-specific machine learning ensemble for contextually accurate performance prediction, in an embodiment.

FIG. 4 is a flow diagram that depicts computer 300 training an algorithm-specific machine learning ensemble for contextually accurate performance prediction, in an embodiment. FIG. 4 is discussed with reference to FIG. 3.

5.1 Preparing

Step 401 is preparatory. In step 401, testing datasets are received, stored, generated, or otherwise obtained. For example, a human expert or a data warehouse provides test datasets 311-312 as files, query result sets, or streams.

Steps 402-405 are repeated for each available machine learning algorithm. In particular, steps 402-404 are repeated for each model of each algorithm. In particular, steps 403-404 are repeated for each testing dataset with each model of each algorithm.

Step 402 configures a model of an algorithm based on respective particular values for hyperparameters of the algorithm. For example, each of models 371-372 is separately configured with a distinct set of values, such as 381-382 respectively, for a shared set of hyperparameters that are common to algorithm 321.

After sufficient repetitions of step 402, all models of all algorithms 321-323 are distinctly configured and ready for training. Although not shown, model training may occur between steps 402-403 based on training datasets (not shown).

5.2 Modeling

Each occurrence of step 403 performs a distinct test. Step 403 tests a model of an algorithm with one of the testing datasets to calculate a respective test score. For example during one test, model 372 may generate test score 342 when stimulated by test dataset 311.

Step 404 records a distinct tuple for each test performed in step 403. Each tuple references, identifies, or contains each of: respective particular values for hyperparameters of the algorithm, the testing dataset, the respective test score, and the algorithm.

For example, tuple 332 is recorded when model 372 is tested with test dataset 311. Tuple 332 may indicate test dataset 311, test score 342, hyperparameters 382, algorithm 321, and/or model 372.

After sufficient repetitions of step 404, all models of all algorithms 321-323 have been individually tested with each testing dataset 311-312, and all tuples 331-333 were recorded. Thus, all ensembles are ready for training.

5.3 Ensemble Training

Step 405 independently trains each algorithm 321-323's ensemble, such as 390. For each meta-model that is associated with an algorithm, step 405 trains all of the algorithm's meta-models based on at least one distinct tuple recorded for that algorithm.

For example, tuples 331-332 are used to train meta-model 352. After sufficient repetitions of step 405, all meta-models of all algorithms 321-323 have been trained, which means that all ensembles, such as 390, have been trained.

In an embodiment, ensemble training is implemented with some combination of Keras Python library, TensorFlow, and/or Apache MXNet, which horizontally scale such as with multiple graphical processing units (GPUs).

After step 405, each of algorithm 321-323's ensemble is ready for inferencing, such as during exposure to a particular inferencing dataset (unshown and likely larger than any test dataset 311-312).

6.0 Value Translation

Figure 5:
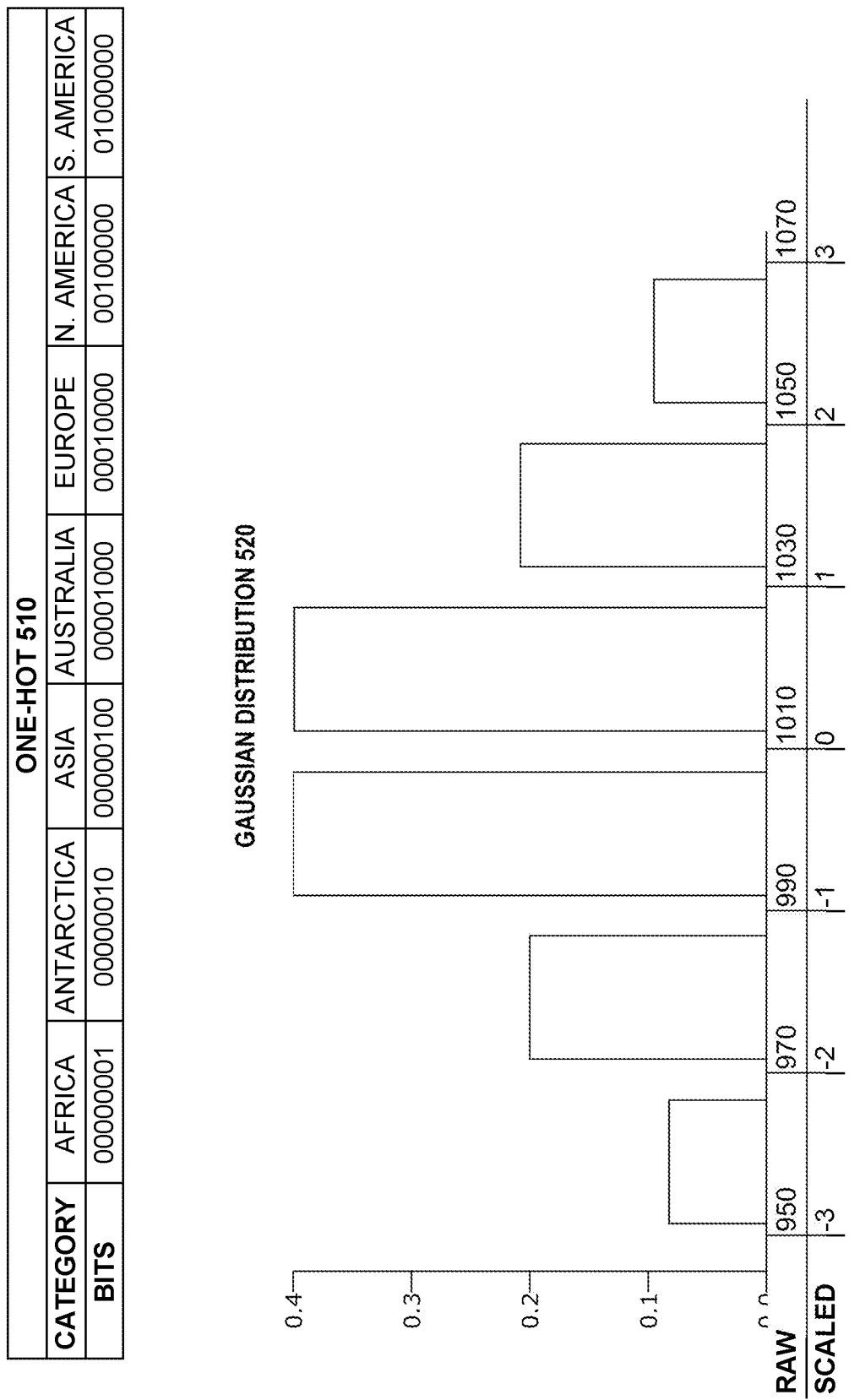
FIG. 5 is a block diagram that depicts an example computer that adjusts feature (hyperparameter and meta-feature) values for uniformity, portability, and genericity, in an embodiment.

FIG. 5 is a block diagram that depicts an example computer 500, in an embodiment. Computer 500 adjusts feature (hyperparameter and meta-feature) values for uniformity, portability, and genericity. Computer 500 may be an implementation of computer 100.

6.1 Raw Data

Computer 500 contains adjusted data 510 and 520 that was transformed from raw (e.g. wild) data. Raw data may naturally be numeric or categoric.

6.2 Categories

Categoric data is non-numeric data whose domain consists of discrete (symbolic) values. For uniformity, portability, and genericity, non-numeric data may be converted to numeric.

For example, calendar months January thru December may convert to integers from one to twelve. Thus, a natural relative ordering of months is preserved, and a natural distance between months (e.g. between March=3 and July=7) is meaningful (e.g. 7-3=4).

However, categoric data may have values (categories) that are naturally unordered, in which case a dense numeric encoding may cause neighboring numbers to be falsely treated as semantically similar (adjacent). To prevent such false associations from distorting training, a geometric scale of numbers may be assigned to the categories, such that each number is at least an order of magnitude away from all other values.

6.3 One-Hot Encoding

For example, table one-hot 510 shows terrestrial continents as categories, which are naturally unordered. With one-hot encoding, each bit in a string of seven or eight bits may be reserved for a continent, somewhat like a bitmap.

For example, the least significant bit is reserved for Africa, which is one-hot encoded as 00000001. Alternatively, categories may be encoded as one-cold, which is the bitwise inverse of one-hot, such that only one bit is clear (zero) in the bitmap.

6.4 Numbers

Numeric data may be normalized for uniformity, portability, and genericity. Normalization may entail imposing a zero-mean and/or unit-variance.

6.5 Zero-Mean

Zero-mean shifts the range of numbers until the arithmetic mean becomes zero, which may or may not also be the arithmetic median and/or mode. For example, gaussian distribution 520 of raw data has a raw mean of 1010, which is then substracted from all values to achieve a normalized mean of zero, with lesser values going negative.

6.6 Unit-Variance

Unit-variance scales (e.g. compresses) the range of numbers until the statistical variance is one. For example, shown adjacent raw values 970 and 990 may be 990–970=20 units apart. Those two numbers are compressed to be one unit apart, which in this example are −2 and −1 respectively.

6.7 Normalization

When both zero-mean and unit-variance adjustments occur (as shown for gaussian distribution 520), then values, subranges, and distances become uniform regardless of discrepant original raw scales. For example, a compass direction may range from zero to 360, and a Fahrenheit temperature may seasonally range from −20 to 120.

After normalization as described, a delta of a given magnitude between two normalized compass directions may represent a same amount of change as the same given magnitude of change between to normalized temperatures. Thus, exploration of a multidimensional solution space may occur along either (direction or temperature) axis using similar increments.

Therefore, all axes are likely to be explored and scored more or less evenly, such that optimization of one axis does not accidentally dominate over consideration of the other axes of the solution space. Such normalization also makes scores readily comparable, such that scores from sibling meta-models can be reliably ranked (relatively ordered by value), as well as scores emitted from different algorithms.

7.0 Meta-Optimization

Figure 6:
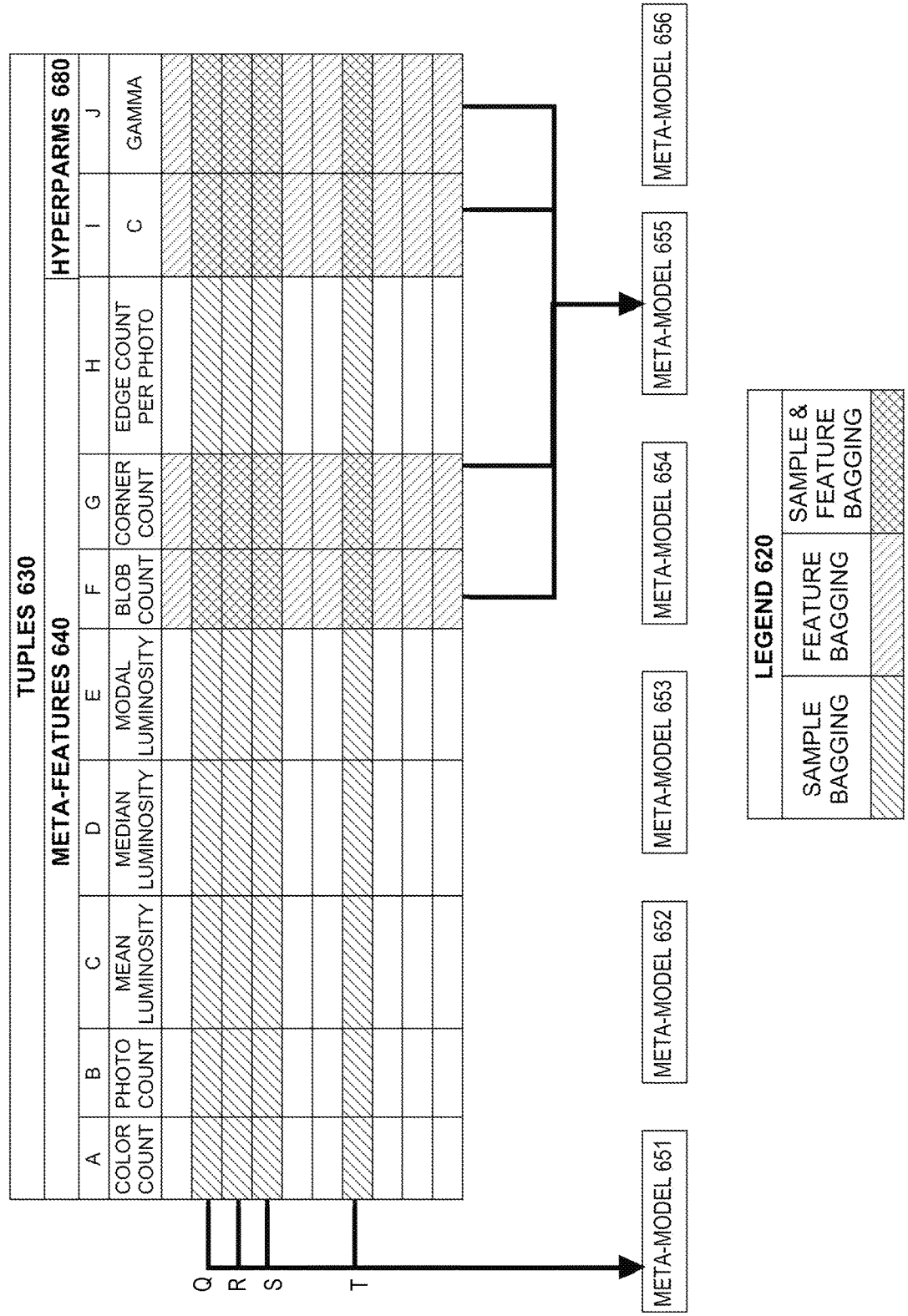
FIG. 6 is a block diagram that depicts an example computer that improves ensemble meta-learning with optimizations such as boosting and bagging, in an embodiment.

FIG. 6 is a block diagram that depicts an example computer 600, in an embodiment. Computer 600 improves ensemble meta-learning with optimizations such as boosting and bagging. Computer 500 may be an implementation of computer system 100.

Computer 600 trains an ensemble (not shown) that includes meta-models 651-656 that learn by using tuples 630 as a training dataset. Tuples 630 recorded performance for various test datasets from various configurations of a particular machine learning algorithm X (not shown) after training, as explained for FIG. 3. Meta-models 651-656 may be instances of another machine learning algorithm Y (not shown), which may or may not be different from algorithm X.

Tuples 630 contain hyperparameters 680 that configured distinct instances of algorithm X. Tuples 630 also contains meta-features 640 as extracted from various testing datasets (not shown) for algorithm X.

Although not shown, tuples 630 may also contain other data such as test scores of algorithm X. Each tuple (row) of tuples 630 represents one test involving one model (instance) of algorithm X that inferenced one testing dataset.

7.1 Variance

A tradeoff between bias and variance is endemic to machine learning such as with training of meta-models 651-656. Variance (a.k.a. overfitting) is oversensitivity during training that causes noise to be mistaken for meaningful patterns that make lasting false impressions.

7.2 Bias

Bias (a.k.a. underfitting) is under-sensitivity that causes meaningful patterns to be ignored as noise that prolongs training or prevents complete training.

7.3 Bootstrap Aggregating

Distortions such as variance can be decreased by refactoring an ensemble training dataset, such as tuples 630, by decomposing the dataset into partially overlapping subsets of data with a technique known as bootstrap aggregating (a.k.a. bagging).

7.4 Feature Bagging

Feature bagging entails training each of meta-models 651-656 with a distinct partially overlapping subset of training dataset features such as meta-features 640 and hyperparameters 680. For example according to legend 620, only meta-features F-G and hyperparameters I-J of tuples 630 are used to train meta-model 655.

7.5 Sample Bagging

Sample bagging entails training each of meta-models 651-656 with a distinct partially overlapping subset of training dataset rows of tuples 630. For example according to legend 620, only rows Q-T of tuples 630 are used to train meta-model 651.

7.6 Dataset Partitioning

Although not shown, sample bagging and feature bagging may both be used to train a same meta-model. For example, meta-models 651-656 may each be trained with a respective subset of columns of a respective subset of rows of tuples 630.

7.7 Overlap

The subsets of tuples 630 may partially overlap. For example although not shown, sample bagging may train meta-model 652 with the bottom four rows of tuples 630, which includes row T that is also used to train meta-model 651 as shown. Ideally, at most one-third of a meta-model's training subset should overlap with other subset(s), whether sample or feature bagging.

7.8 Boosting

Another ensemble meta-learning optimization is hypothesis boosting that can decrease variance and especially bias. Boosting assigns weights to rows of tuples 630.

Each row of tuples 630 depending on how easy (readily) is training meta-models 651-656 to learn from that row. Initially all rows are weighted equally.

During training, a row that is processed accurately (low error) has its weight reduced. Conversely, a row with high error gets increased weight.

Training can be repeated with some or all rows of tuples 630 as their weights evolve to achieve a higher accuracy than training with each row only once. In an embodiment, training is repeated only with rows having at least a threshold weight.

In an embodiment, the threshold is progressively increased. In an embodiment, training ceases when few or no row weights exceed the threshold.

Boosting may also assign weights to meta-models 651-656 of an ensemble based on their accuracy. Thus, a more reliable meta-model may have more influence over an ensemble score than a less reliable meta-model.

Meta-model weights can be adjusted based on observed accuracy at various times during training. In an embodiment, training ceases when most or all meta-model weights cease to change by at least a threshold amount.

7.9 Ensemble Optimization

Ensemble meta-learning is amenable to additional meta-optimization before training. An ensemble itself has hyperparameters (not shown) such as percentage of features (hyperparameters, meta-features) per meta-model for feature bagging, percentage of rows for sample bagging, and count of meta-models.

Likewise, meta-models 651-656 themselves have hyperparameters (not shown) such as count of layers if an ensemble is composed of neural networks or other hyperparameters if composed of another machine learning algorithm. Meta-optimization may use gradient descent, Bayesian optimization, SVM, or a decision tree. Computer 600 may use a hyperparameter optimization tool such as the hyperopt Python library to optimize the configuration of an ensemble and/or its constituent meta-models 651-656. By design, hyperopt is horizontally scalable.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
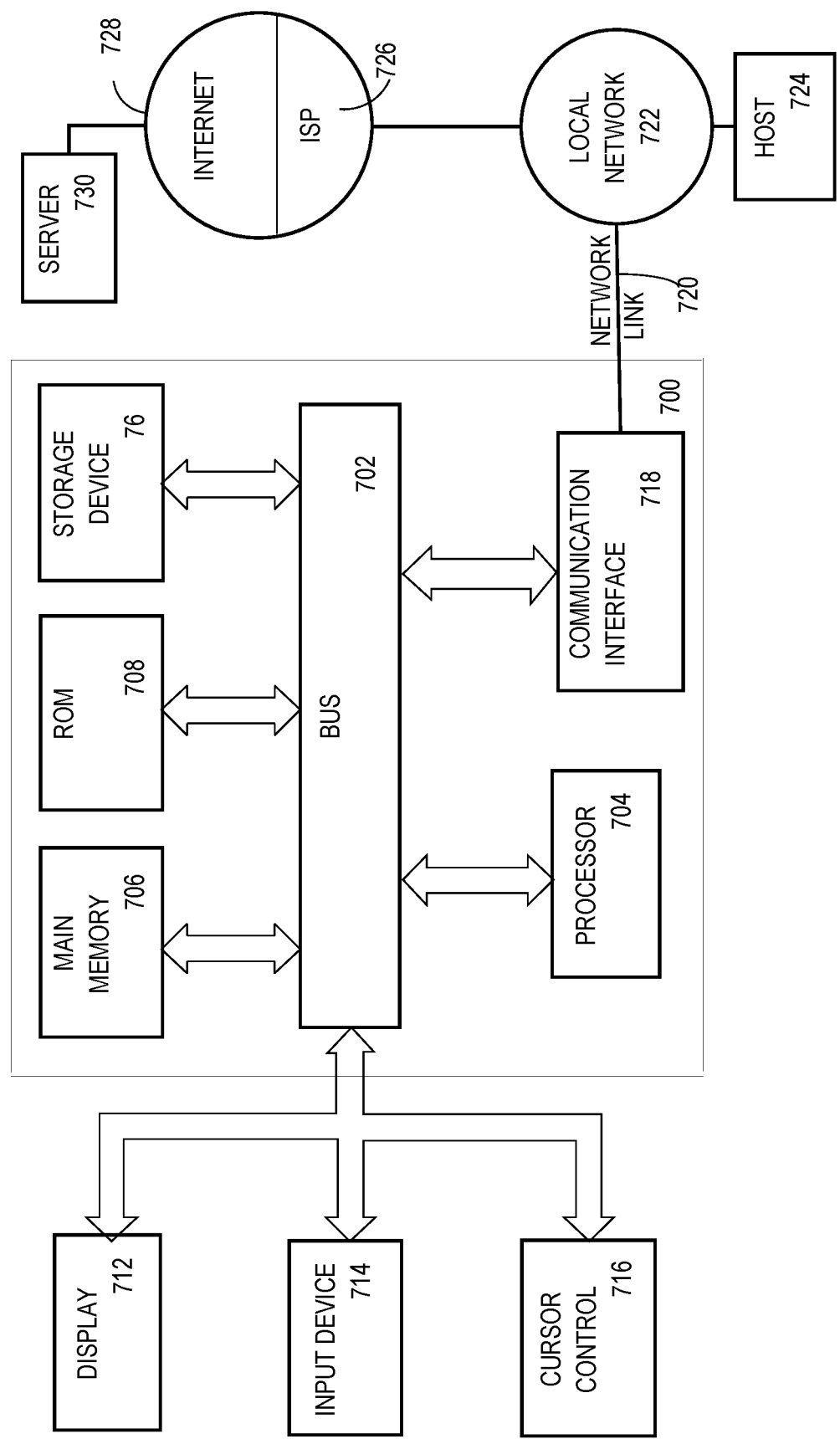
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 76, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 76. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 76. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 76 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 76, or other non-volatile storage for later execution.

10.0 Software Overview

Figure 8:
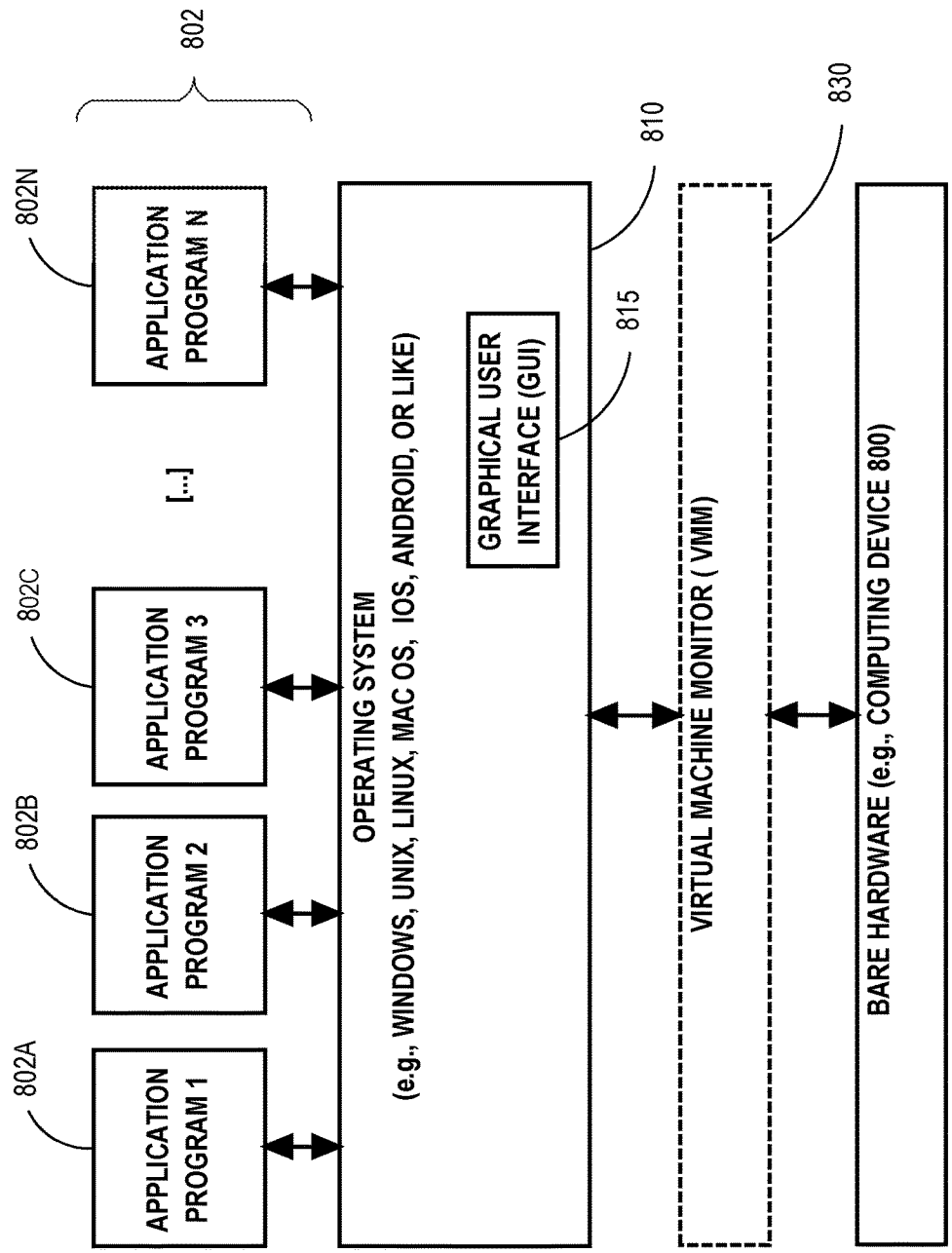
FIG. 8 is a block diagram that illustrates a basic software system that may be employed for controlling the operation of a computing system.

FIG. 8 is a block diagram of a basic software system 800 that may be employed for controlling the operation of computing system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 700. Software system 800, which may be stored in system memory (RAM) 706 and on fixed storage (e.g., hard disk or flash memory) 76, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 76 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 800 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

8.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    deriving a plurality of meta-feature values that describe an inference dataset as a whole by, for each meta-feature of a plurality of meta-features, deriving a respective meta-feature value from an inference dataset;
    for each algorithm of a plurality of trainable algorithms:
        for each algorithm-specific meta-model of a plurality of algorithm-specific regression meta-models that are respectively associated with the algorithm, predicting a respective score by invoking the algorithm-specific meta-model based on a) a respective subset of meta-feature values of the plurality of meta-feature values, and b) hyperparameter values of a respective subset of a plurality of hyperparameters of the algorithm, wherein the respective score indicates at least one selected from the group consisting of: an accuracy of the algorithm from training with the inference dataset and a duration needed to train the algorithm with the inference dataset;
    selecting, based on a comparison of the respective scores of the plurality of algorithm-specific regression meta-models, one or more algorithms of the plurality of trainable algorithms; and
    training and invoking, based on the inference dataset, the one or more algorithms to obtain a result;
    wherein the method is performed by one or more computers.

2. The method of claim 1 wherein:
    selecting the one or more algorithms comprises:
        ranking the plurality of trainable algorithms based on the respective scores, and selecting multiple algorithms based on the ranking.

3. The method of claim 1 wherein said hyperparameter values are default values.

4. The method of claim 1 wherein:
    each algorithm of the plurality of trainable algorithms is associated with a respective algorithm-specific ensemble of a plurality of algorithm-specific ensembles that contains said plurality of algorithm-specific regression meta-models that are associated with the algorithm;

the method further comprises deriving, for each algorithm of the plurality of trainable algorithms, a respective ensemble score that is based on the respective scores of the plurality of algorithm-specific regression meta-models that are associated with the algorithm;

selecting the one or more algorithms based on the respective scores comprises selecting the one or more algorithms based on the respective ensemble scores.

5. The method of claim 1 further comprising:
storing a plurality of testing datasets;
for each algorithm of the plurality of trainable algorithms:
for each model of a plurality of models that are based on the algorithm:
configuring the model based on respective particular values for said plurality of hyperparameters of the algorithm; and
for each testing dataset of the plurality of testing datasets:
testing the model based on the testing dataset to calculate a respective test score; and
recording a distinct tuple that references: the respective particular values for said plurality of hyperparameters, the testing dataset, the respective test score, and the algorithm; and
for each algorithm-specific meta-model of the plurality of algorithm-specific regression meta-models that are associated with the algorithm, training the algorithm-specific meta-model based on at least one of said distinct tuples recorded for the algorithm.

6. The method of claim 5 wherein said plurality of meta-features excludes meta-features that are missing a value in a percentage of the distinct tuples that exceeds a threshold.

7. The method of claim 5 further comprising cross validating the plurality of models with an original training dataset that is partitioned into: a plurality of training datasets and said plurality of testing datasets.

8. The method of claim 5 further comprising generating, in parallel, multiple tuples of said distinct tuples.

9. The method of claim 1 wherein the plurality of trainable algorithms comprises a random forest.

10. The method of claim 1 wherein the plurality of trainable algorithms comprises anomaly detection.

11. The method of claim 1 wherein each algorithm-specific meta-model of the plurality of algorithm-specific regression meta-models comprises a distinct artificial neural network.

12. The method of claim 1 further comprising applying a softmax function to the respective scores of the plurality of algorithm-specific regression meta-models.

13. The method of claim 1 further comprising converting values of a non-numeric meta-feature of said plurality of meta-features by an encoding scheme of one-cold.

14. The method of claim 1 further comprising converting values of a numeric meta-feature of said plurality of meta-features by at least one encoding scheme of: zero mean or unit variance.

15. The method of claim 1 further comprising, for each algorithm of the plurality of trainable algorithms, optimizing a count of algorithm-specific meta-models in the plurality of algorithm-specific regression meta-models that are associated with the algorithm.

16. The method of claim 15 wherein said optimizing comprises using at least one selected from the group consisting of: Bayesian optimization and a decision tree.

17. The method of claim 1 further comprising assigning meta-features as inputs for each algorithm-specific meta-model of the plurality of algorithm-specific regression meta-models that are associated with each algorithm of the plurality of trainable algorithms by at least one selected from the group consisting of: sample bagging and feature bagging.

18. One or more non-transitory computer-readable media storing instructions that, when executed by one or more processors, cause:
deriving a plurality of meta-feature values that describe an inference dataset as a whole by, for each meta-feature of a plurality of meta-features, deriving a respective meta-feature value from an inference dataset;
for each algorithm of a plurality of trainable algorithms:
for each algorithm-specific meta-model of a plurality of algorithm-specific regression meta-models that are respectively associated with the algorithm, predicting a respective score by invoking the algorithm-specific meta-model based on a) a respective subset of meta-feature values of the plurality of meta-feature values, and b) hyperparameter values of a respective subset of a plurality of hyperparameters of the algorithm, wherein the respective score indicates at least one selected from the group consisting of: an accuracy of the algorithm from training with the inference dataset and a duration needed to train the algorithm with the inference dataset;
selecting, based on a comparison of the respective scores of the plurality of algorithm-specific regression meta-models, one or more algorithms of the plurality of trainable algorithms; and
training and invoking, based on the inference dataset, the one or more algorithms to obtain a result.

19. The one or more non-transitory computer-readable media of claim 18 wherein:
each algorithm of the plurality of trainable algorithms is associated with a respective algorithm-specific ensemble of a plurality of algorithm-specific ensembles that contains said plurality of algorithm-specific regression meta-models that are associated with the algorithm;
the instructions further cause deriving, for each algorithm of the plurality of trainable algorithms, a respective ensemble score that is based on the respective scores of the plurality of algorithm-specific regression meta-models that are associated with the algorithm;
selecting the one or more algorithms based on the respective scores comprises selecting the one or more algorithms based on the respective ensemble scores.

20. The one or more non-transitory computer-readable media of claim 18 wherein the instructions further cause:
storing a plurality of testing datasets;
for each algorithm of the plurality of trainable algorithms:
for each model of a plurality of models that are based on the algorithm:
configuring the model based on respective particular values for said plurality of hyperparameters of the algorithm; and
for each testing dataset of the plurality of testing datasets:
testing the model based on the testing dataset to calculate a respective test score; and recording a distinct tuple that references: the respective particular values for said plurality of hyperparameters, the testing dataset, the respective test score, and the algorithm; and for each algorithm-specific meta-model of the plurality of algorithm-specific regression meta-models that are associated with the algorithm, training the algorithm-specific meta-model based on at least one of said distinct tuples recorded for the algorithm.

\* \* \* \* \*